United States Patent
Zhu et al.

(10) Patent No.: US 11,224,085 B2
(45) Date of Patent: Jan. 11, 2022

(54) METHOD AND APPARATUS FOR INITIATING USER PLANE PATH RE-ESTABLISHMENT AND COMMUNICATIONS SYSTEM

(71) Applicant: HUAWEI TECHNOLOGIES CO., LTD., Guangdong (CN)

(72) Inventors: Fenqin Zhu, Shanghai (CN); Dekui Sun, Shenzhen (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/415,148

(22) Filed: May 17, 2019

(65) Prior Publication Data
US 2019/0274181 A1   Sep. 5, 2019

Related U.S. Application Data

(63) Continuation of application No. PCT/CN2018/077025, filed on Feb. 23, 2018.

(30) Foreign Application Priority Data

Mar. 17, 2017   (CN) .......................... 201710161100.6

(51) Int. Cl.
*H04W 76/19*   (2018.01)
*H04W 8/08*   (2009.01)
(Continued)

(52) U.S. Cl.
CPC ............. *H04W 76/19* (2018.02); *H04W 8/08* (2013.01); *H04W 36/0011* (2013.01);
(Continued)

(58) Field of Classification Search
CPC ... H04W 76/19; H04W 8/08; H04W 36/0011; H04W 36/0061; H04W 36/08;
(Continued)

(56) References Cited

U.S. PATENT DOCUMENTS 9,712,685 B2 *   7/2017   Salot ..................... H04W 24/10
2010/0189076 A1   7/2010   Kim
(Continued)

FOREIGN PATENT DOCUMENTS

CN   101039506 A   9/2007
CN   101094509 A   12/2007
(Continued)

OTHER PUBLICATIONS

U.S. Appl. No. 62/455,418 (Feb. 6th) (Year: 2017).*
(Continued)

*Primary Examiner* — Ian N Moore
*Assistant Examiner* — Rushil Parimal Sampat
(74) *Attorney, Agent, or Firm* — Leydig, Voit & Mayer, Ltd.

(57) ABSTRACT

A method and an apparatus for initiating user plane path re-establishment and a communications system are disclosed. The method includes: determining, by a session management function entity based on first location information of a terminal device, a session service area to which a current session of the terminal device belongs; and after receiving second location information of the terminal device sent by a mobility management function entity, if determining that the second location information is not within the session service area, instructing the terminal device to initiate a re-establishment procedure for the current session or initiate a handover procedure. Due to introduction of the session service area, when the terminal device moves back and forth at edges of service areas of two adjacent user plane (Continued)

function entities, a ping-pong effect caused by frequent handover between the two user plane function entities is avoided, and user experience is improved.

17 Claims, 15 Drawing Sheets

(51) Int. Cl.
*H04W 36/00* (2009.01)
*H04W 36/08* (2009.01)
*H04W 36/32* (2009.01)
*H04W 36/24* (2009.01)

(52) U.S. Cl.
CPC ....... *H04W 36/0061* (2013.01); *H04W 36/08* (2013.01); *H04W 36/24* (2013.01); *H04W 36/32* (2013.01)

(58) Field of Classification Search
CPC ..... H04W 36/24; H04W 36/32; H04W 76/22; H04W 64/003; H04W 4/029; H04W 76/12; H04W 4/021
See application file for complete search history.

(56) References Cited

U.S. PATENT DOCUMENTS

| | | | |
|---|---|---|---|
| 2014/0242939 | A1 | 8/2014 | Salot et al. |
| 2015/0181550 | A1 | 6/2015 | Ward et al. |
| 2018/0227743 | A1* | 8/2018 | Faccin ................. H04W 48/17 |
| 2019/0380167 | A1* | 12/2019 | Cheng ................. H04W 76/22 |

FOREIGN PATENT DOCUMENTS

| | | |
|---|---|---|
| CN | 101563887 A | 10/2009 |
| CN | 106102106 A | 11/2016 |
| EP | 1914928 A1 | 4/2008 |
| JP | 2010507300 A | 3/2010 |
| WO | 2009055827 A1 | 4/2009 |

OTHER PUBLICATIONS

S2-171448 Huawei et al.,"TS 23.501 Terminology and role of applications and Application Functions",SA WG2 Meeting #119,Feb. 13-17, 2017, Dubrovnik, Croatia,total 9 pages.
S2-171028 Samsung,"TS 23.502: Xn based inter NG RAN handover procedures",SA WG2 Meeting #119,Feb. 13-17, 2017, Dubrovnik, Croatia,total 3 pages.
S2-170208 Huawei, HiSilicon,"Functionalities of UPF and SMF",3GPP TSG SA WG2 Meeting #118bis,Jan. 16-20, 2017, Spokane, US,total 2 pages.
S2-170210 Huawei, HiSilicon,"Selection of SMF",SA WG2 Meeting #118Bis,Jan. 16-20, 2017, Spokane, America, total 1 pages.
3GPP TS 23.501 V0.3.1 (Mar. 2017),3rd Generation Partnership Project;Technical Specification Group Services and System Aspects;System Architecture for the 5G System;Stage 2(Release 15),dated Mar. 6, 2017,total 97 pages.
3GPP TS 23.502 V0.2.0 (Feb. 2017),3rd Generation Partnership Project;Technical Specification Group Services and System Aspects;Procedures for the 5G System;Stage 2(Release 15),total 71 pages.
S2-162641 LG Electronics,"Update of solution 6.6.1—Session and service continuity framework",SA WG2 Meeting #115,May 23-27, 2016, Nanjing, P.R. China,total 3 pages.
3GPP TR 23.799 V14.0.0 (Dec. 2016),I3rd Generation Partnership Project;Technical Specification Group Services and System Aspects;Study on Architecture for Next Generation System(Release 14),total 522 pages.
S2-170192 Nokia et al.,"Services supported by Network Functions ",SA WG2 Meeting #118bis,Jan. 16-20, 2017, Spokane, WA, USA,total 5 pages.
Catt, "TS 23.502: SMF relocation during a registration update procedure," SA WG2 Meeting #119, Dubrovnik, Croatia, S2-171057, total 6 pages (Feb. 13-17, 2017).
LG Electronics, "SSC mode and UE mobility," SA WG2 Meeting #118-BIS, Spokane, WA, USA, S2-170238, total 4 pages (Jan. 16-20, 2017).
Samsung, "Baseline description for Network Function selection," SA WG2 Meeting #118bis, Spokane, USA, S2-170258, total 5 pages (Jan. 16-20, 2017).

* cited by examiner

Session management function device apparatus for initiating user plane path re-establishment Session management function device

METHOD AND APPARATUS FOR INITIATING USER PLANE PATH RE-ESTABLISHMENT AND COMMUNICATIONS SYSTEM

CROSS-REFERENCE TO RELATED APPLICATIONS

This application is a continuation of International Application No. PCT/CN2018/077025, filed on Feb. 23, 2018, which claims priority to Chinese Patent Application No. 201710161100.6, filed on Mar. 17, 2017. The disclosures of the aforementioned applications are hereby incorporated by reference in their entireties.

TECHNICAL FIELD

This application relates to the field of communications technologies, and in particular, to a method and an apparatus for initiating user plane path re-establishment and a communications system.

BACKGROUND

In a $5^{th}$ generation ($5^{th}$ Generation, 5G) mobile communications technology, mobility management and session management are separately implemented by two entities: a core access and mobility management function (Core Access and Mobility Management Function, AMF) and a session management function (Session Management Function, SMF). The AMF is responsible for mobility management for terminal devices, including making a tracking area list (Tracking Area List, TA List). The SMF is responsible for session management, including: selecting a user plane function (User Plane Function, UPF), establishing a packet data unit (Packet Data Unit, PDU) session, and so on. In addition, in $5C_5$ UPFs may be classified into N3 UPFs and PDU session anchor UPFs (PDU Session Anchor, PSA for short) based on different functions for which the UPFs are responsible. The N3 UPF is connected to a radio access network (Radio Access Network, RAN) through an N3 interface, and the PSA is connected to a data network through an N6 interface. Each UPF has a particular service range. Specifically, a service range of an N3 UPF is a sum of service ranges of RANs connected to the N3 UPF. When a terminal device establishes a user plane path to an N3 UPF and a PSA, the N3 UPF and the PSA can generally provide relatively good services for the terminal when the terminal device is located within a service range of the N3 UPF and an optimal service area of the PSA.

However, when the terminal device is a mobile terminal device such as a mobile phone, a location of the terminal device is not permanent. In 5G compared with a $4^{th}$ generation ($4^{th}$ Generation, 4G) mobile communications technology, a deployment location of a UPF is relatively flexible, a service range of the UPF varies greatly with the deployment location, and mobility management and session management are separately implemented by two entities. Therefore, to better serve data communication of the terminal device, a user plane path needs to be re-established. However, in the existing 5G standards, a mechanism for initiating user plane path re-establishment is not clearly defined. In view of this, embodiments of this application provide a method for initiating user plane path re-establishment.

SUMMARY

This application provides a method and an apparatus for initiating user plane path re-establishment and a communications system, to better serve a session of a terminal device, and thereby improving user experience.

According to a first aspect, an embodiment of this application provides a method for initiating user plane path re-establishment, including:

determining, by a session management function entity based on first location information of a terminal device, a session service area to which a current session of the terminal device belongs; and after receiving second location information of the terminal device sent by a mobility management function entity, if determining that the second location information is not within the session service area, instructing the terminal device to initiate a re-establishment procedure for the current session or initiate a handover procedure, where the handover procedure is used to switch from a user plane function entity serving the current session to a target user plane function entity, the target user plane function entity is configured to serve a session of the terminal device after the handover procedure is completed, and the first location information is location information of the terminal device received by the session management function entity in a process of establishing the current session or in a process of handover from a first user plane function entity to a second user plane function entity, the first user plane function entity is configured to serve a session of the terminal device before the handover to the second user plane function entity, and the second user plane function entity is configured to serve the current session.

It should be noted that the process of establishing the current session in this embodiment of this application includes a process of initially establishing the current session and a process of re-establishing a session to the current session.

Due to introduction of the session service area, when the terminal device moves back and forth at edges of service areas of two adjacent user plane function entities, a ping-pong effect caused by frequent handover between the two user plane function entities is avoided, and user experience is improved.

According to the first aspect, in a possible implementation, the session service area includes a service area of the user plane function entity serving the current session.

According to the first aspect, in a possible implementation, when the session service area includes a part of the service area of the user plane function entity serving the current session, after the session management function entity receives the second location information of the terminal device sent by the mobility management function entity, when determining that the second location information is not within the session service area and determining that the second location information is not within the service area of the user plane function entity serving the current session, the session management function entity instructs the terminal device to initiate the re-establishment procedure for the current session or initiate the handover procedure.

According to the first aspect, in a possible implementation, the session management function entity uses the first location information of the terminal device as a center, to determine a center location of the session service area, and determines a size of the session service area.

According to the first aspect, in a possible implementation, the session management function entity determines the size of the session service area in the following manner:

determining, by the session management function entity, the size of the session service area based on the service area of the user plane function entity serving the current session and/or based on a mobility pattern of the terminal device, where the mobility pattern includes at least one of a moving range of the terminal device, a moving speed of the terminal device, and a moving track of the terminal device.

According to the first aspect, in a possible implementation, after determining the session service area, the session management function entity determines a location report granularity of the terminal device based on the session service area, and sends the location report granularity to the mobility management function entity, where the location report granularity is used to indicate a range for the mobility management function entity to report location information of the terminal device to the session management function entity.

Use of the location report granularity reduces a quantity of signaling for the mobility management function entity to report location information of the terminal device to the session management function entity. Therefore, the mobility management function entity does not need to report location information of the terminal device to every session management function entity each time the mobility management function receives the location information of the terminal.

According to the first aspect, in a possible implementation, the session management function entity obtains at least one location report requirement, where the at least one location report requirement includes at least one piece of area information, and the at least one piece of area information is used to indicate a range in which the terminal device needs to report location information; and determines the location report granularity based on the session service area and the at least one piece of area information, where the location report granularity is an intersection of the session service area and the at least one piece of area information.

According to a second aspect, an embodiment of this application provides an apparatus for initiating user plane path re-establishment, including one or more modules that can implement any one of the first aspect or the implementations of the first aspect. Each module may perform one or more steps.

According to a third aspect, an embodiment of this application further provides a session management function device. The session management function device includes a processor, a memory, and a communications interface. The communications interface is configured to receive and send information. The memory is configured to store a software program, received or sent data information, and the like. The processor is configured to: read the software program and the data that are stored in the memory, to implement the method provided in any one of the first aspect or the implementations of the first aspect.

According to a fourth aspect, an embodiment of this application further provides a computer storage medium. The storage medium may be non-volatile, to be specific, content is not lost after a power outage. The storage medium stores a software program. The software program is read and executed by one or more processors, to implement the method provided in any one of the first aspect or the implementations of the first aspect.

According to a fifth aspect, an embodiment of this application provides a computer program product including an instruction. When the computer program product is run on a computer, the computer performs the method provided in any one of the first aspect or the implementations of the first aspect.

According to a sixth aspect, an embodiment of this application further provides a communications system, including a session management function entity and a mobility management function entity. The session management function entity is configured to: determine, based on first location information of a terminal device, a session service area to which a current session of the terminal device belongs; and after receiving second location information of the terminal device sent by the mobility management function entity, if determining that the second location information is not within the session service area, instruct the terminal device to initiate a re-establishment procedure for the current session or initiate a handover procedure. The handover procedure is used to switch from a user plane function entity serving the current session to a target user plane function entity, and the target user plane function entity is configured to serve a session of the terminal device after the handover procedure is completed. The first location information is location information of the terminal device received by the session management function entity in a process of establishing the current session or in a process of handover from a first user plane function entity to a second user plane function entity. The first user plane function entity is configured to serve a session of the terminal device before the handover to the second user plane function entity, and the second user plane function entity is configured to serve the current session. The mobility management function entity is configured to send the second location information of the terminal device to the session management function entity.

According to the sixth aspect, in a possible implementation, the session management function entity is further configured to: after determining the session service area, determine a location report granularity of the terminal device based on the session service area, and send the location report granularity to the mobility management function entity, where the location report granularity is used to indicate a range for the mobility management function entity to report location information of the terminal device to the session management function entity. The mobility management function entity is further configured to: before sending the second location information of the terminal device to the session management function entity, receive the location report granularity, and determine that the second location information of the terminal device is not within the location report granularity.

It should be noted that the session management function entity in the communications system provided in the sixth aspect may perform the method provided in any one of the first aspect or the implementations of the first aspect in the embodiments of this application.

According to a seventh aspect, an embodiment of this application provides a method for initiating user plane path re-establishment, including:

receiving, by a session management function entity, first location information of a terminal device sent by a mobility management function entity; if determining that the first location information is not within a first service area, selecting a first target user plane function entity based on the first location information; and initiating a user plane path re-establishment procedure for the current session, where the first target user plane function entity serves a session of the terminal device through a re-established user plane path, and the first service area is a service area of a first user plane function entity, and the first user plane function entity is configured to serve the current session of the terminal device.

It should be understood that a service area of the first target user plane function entity usually includes the first location information.

After moving out of the first service area, the terminal device can re-establish a user plane path to the first target user plane function entity. Therefore, with such a mechanism for initiating user plane path re-establishment in this application, a network can better serve terminal devices, and user experience is improved.

According to the seventh aspect, in a possible implementation, before receiving the first location information of the terminal device sent by the mobility management function entity, the session management function entity determines a location report granularity of the terminal device based on the first service area, and sends the location report granularity to the mobility management entity, where the location report granularity is used to indicate a range for the mobility management function entity to report location information of the terminal device to the session management function entity.

Use of the location report granularity reduces a quantity of signaling for the mobility management function entity to report location information of the terminal device to the session management function entity. Therefore, the mobility management function entity does not need to report location information of the terminal device to every session management function entity each time the mobility management function receives the location information of the terminal.

According to the seventh aspect, in a possible implementation, after determining, based on second location information of the terminal device, a session service area to which the current session belongs, the session management function entity determines the location report granularity of the terminal device based on the first service area and the session service area, where the location report granularity is not larger than an intersection area of the first service area and the session service area. The second location information is location information of the terminal device received by the session management function entity in a process of establishing the current session of the terminal device or in a process of handover from a second user plane function entity to a third user plane function entity, the second user plane function entity is configured to serve a session of the terminal device before the handover to the third user plane function entity, and the third user plane function entity is configured to serve the current session.

According to the seventh aspect, in a possible implementation, the session management function entity obtains at least one location report requirement, where the at least one location report requirement includes at least one piece of area information, and the at least one piece of area information is used to indicate a range in which the terminal device needs to report location information; and then determines the location report granularity based on the first service area and the at least one piece of area information, where the location report granularity is an intersection of the first service area and the at least one piece of area information.

According to the seventh aspect, in a possible implementation, after the session management function entity initiates user plane path re-establishment for the current session, the session management function entity establishes a forwarding tunnel if determining that the first user plane function entity has buffered data, where the forwarding tunnel is a tunnel between the first target user plane function entity and the first user plane function entity, so that the first user plane function entity sends the buffered data to the first target user plane function entity through the forwarding tunnel.

According to the seventh aspect, in a possible implementation, after establishing the forwarding tunnel, the session management function entity deletes the forwarding tunnel after receiving a flag that is sent by the first user plane function entity and that indicates completion of sending the buffered data; or the session management function entity starts a forwarding timer after establishing the forwarding tunnel, and deletes the forwarding tunnel after preset duration of the forwarding timer expires.

According to a eighth aspect, an embodiment of this application provides an apparatus for initiating user plane path re-establishment, including one or more modules that can implement any one of the seventh aspect or the implementations of the seventh aspect. Each module may perform one or more steps.

According to an eighth aspect, an embodiment of this application further provides a session management function device. The session management function device includes a processor, a memory, and a communications interface. The communications interface is configured to receive and send information. The memory is configured to store a software program, received or sent data information, and the like. The processor is configured to: read the software program and the data that are stored in the memory, to implement the method provided in any one of the seventh aspect or the implementations of the seventh aspect.

According to a ninth aspect, an embodiment of this application further provides a computer storage medium. The storage medium may be non-volatile, to be specific, content is not lost after a power outage. The storage medium stores a software program. The software program is read and executed by one or more processors, to implement the method provided in any one of the seventh aspect or the implementations of the seventh aspect.

According to a tenth aspect, an embodiment of this application provides a computer program product including an instruction. When the computer program product is run on a computer, the computer performs the method provided in any one of the seventh aspect or the implementations of the seventh aspect.

According to an eleventh aspect, a communications system is provided, including a session management function entity and a mobility management function entity, where the mobility management function entity is configured to send first location information of a terminal device to the session management function entity; and the session management function entity is configured to: after receiving the first location information of the terminal device sent by the mobility management function entity, if determining that the first location information is not within a first service area, select a first target user plane function entity based on the first location information, and initiate a user plane path re-establishment procedure for a current session, where the first service area is a service area of a first user plane function entity, the first user plane function entity is configured to serve the current session of the terminal device, and the first target user plane function entity serves a session of the terminal device through a re-established user plane path.

According to the eleventh aspect, in a possible implementation, the session management function entity is further configured to: determine a location report granularity of the terminal device based on the first service area, and send the location report granularity to the mobility management function entity, where the location report granularity is used to indicate a range for the mobility management function entity to report location information of the terminal device to the session management function entity; and the mobility management function entity is further configured to: before sending the first location information of the terminal device to the session management function entity, receive the location report granularity, and determine that the first location information of the terminal device is not within the location report granularity.

It should be noted that the session management function entity in the communications system provided in the eleventh aspect may perform the method provided in any one of the seventh aspect or the implementations of the seventh aspect in the embodiment of this application.

According to a twelfth aspect, a location information reporting method is provided, including:

receiving, by a mobility management function entity, a location report granularity for a current session of a terminal device; and when determining that the location information of the terminal device is not within the location report granularity, sending location information of the terminal device to a session management function entity; or when determining that the location information of the terminal device is within the location report granularity, determining not to send location information of the terminal device to a session management function entity.

Use of the location report granularity reduces a quantity of signaling for the mobility management function entity to report location information of the terminal device to the session management function entity. Therefore, the mobility management function entity does not need to report location information of the terminal device to every session management function entity each time the mobility management function receives the location information of the terminal.

According to a thirteenth aspect, an embodiment of this application provides a location information reporting apparatus, including one or more modules that can implement any one of the twelfth aspect or the implementations of the twelfth aspect. Each module may perform one or more steps.

According to a fourteenth aspect, an embodiment of this application further provides a mobility management function device. The mobility management function device includes a processor, a memory, and a communications interface. The communications interface is configured to receive and send information. The memory is configured to store a software program, received or sent data information, and the like. The processor is configured to: read the software program and the data that are stored in the memory, to implement the method provided in any one of the twelfth aspect or the implementations of the twelfth aspect.

According to a fifteenth aspect, an embodiment of this application further provides a computer storage medium. The storage medium may be non-volatile, to be specific, content is not lost after a power outage. The storage medium stores a software program. The software program is read and executed by one or more processors, to implement the method provided in any one of the twelfth aspect or the implementations of the twelfth aspect.

According to a sixth aspect, an embodiment of this application further provides a computer program product including an instruction. When the computer program product is run on a computer, the computer performs the method in the foregoing aspects.

DESCRIPTION OF EMBODIMENTS

The following further describes in detail this application with reference to accompanying drawings.

It should be noted that a session management function entity, a mobility management function entity, a user plane function entity, and the like in the embodiments of this application are merely names, and the names constitute no limitation on devices. In a future 5G network and other future networks, network elements or entities corresponding to the session management function entity, the mobility management function entity, and the user plane function entity may have other names. This is not specifically limited in the embodiments of this application. For example, the session management function entity may be a session management function (Session Management Function, SMF), the mobility management function entity may be a core access and mobility management function (Core Access and Mobility Management Function, AMF), the user plane function entity may be a user plane function (User Plane Function, UPF), and so on. A collective description is made now and further details are not described below.

In addition, the session management function entity, the mobility management function entity, the user plane function entity, and the like in the embodiments of this application may also have other functions besides functions in the embodiments of this application. This is not specifically limited in the embodiments of this application. For example, the mobility management function entity may also have other functions besides a function of sending location information of a terminal device to the session management function entity. This is not specifically limited in the embodiments of this application.

It should be noted that the session management function entity, the mobility management function entity, the user plane function entity, or the like in the embodiments of this application may be implemented by one physical device, or may be implemented by a plurality of physical devices jointly. This is not specifically limited in the embodiments of this application. In other words, it should be understood that each of the session management function entity, the mobility management function entity, the user plane function entity, and the like in the embodiments of this application may be a logical function module in a physical device, or may be a logical function module including a plurality of physical devices. This is not specifically limited in the embodiments of this application.

Figure 1:
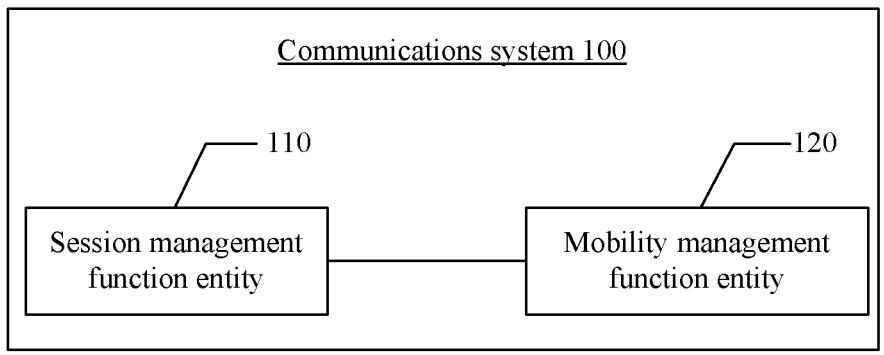
FIG. 1 is a schematic diagram of a communications system according to an embodiment of this application.

A method for initiating user plane path re-establishment in the embodiments of this application may be applied to a communications system 100 shown in FIG. 1. The communications system 100 includes a session management function entity 110 and a mobility management function entity 120. It should be understood that, in the embodiments of this application, a session for which user plane path re-establishment is initiated may be a packet data unit (Packet Data Unit, PDU) session, or a public data network (Public Data Network, PDN) session, or another session. This is not limited in this application.

For information processing and an information exchange process of the session management function entity 110 and the mobility management function entity 120 in the communications system 100 shown in FIG. 1, refer to a method for initiating user plane path re-establishment provided in the following embodiments of this application.

The following describes in detail the method for initiating user plane path re-establishment in the embodiments of this application by using a PDU session as an example. For a PDN session or other sessions, a method for initiating user plane path re-establishment is similar to that for the PDU session, and details are not described herein.

Figure 2A:
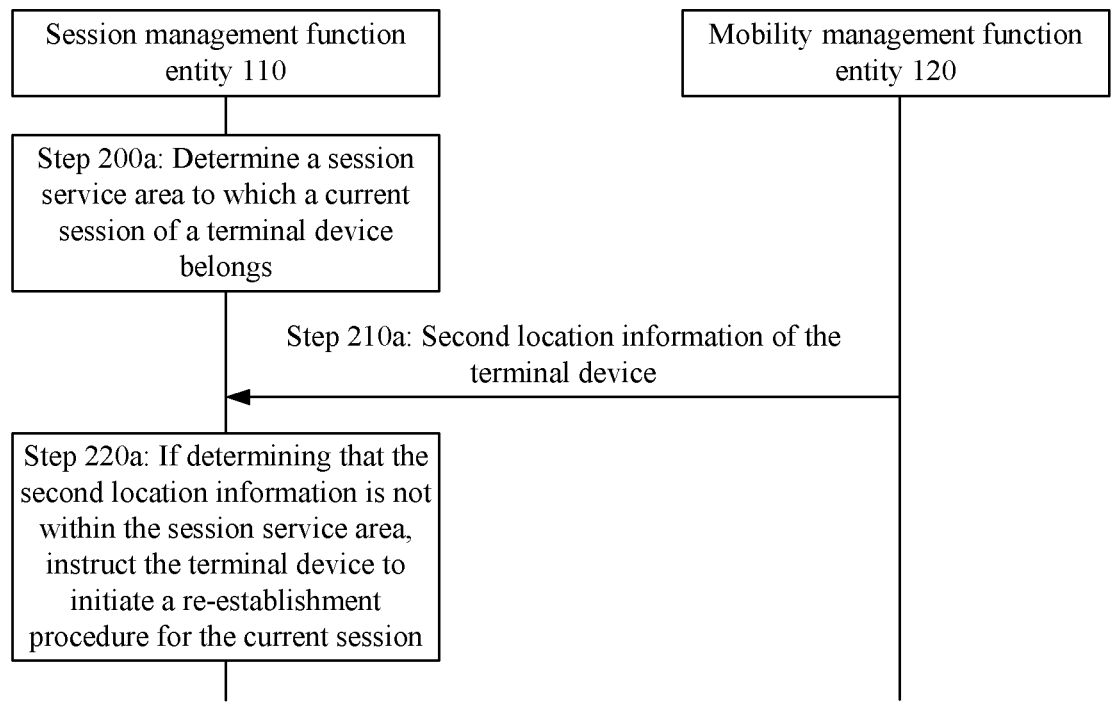
FIG. 2a and FIG. 2b each are a schematic diagram of a procedure of initiating user plane path re-establishment according to an embodiment of this application.

As shown in FIG. 2a, an embodiment of this application provides a method for initiating user plane path re-establishment, including the following steps.

Step 200a: A session management function entity 110 determines, based on first location information of a terminal device, a session service area to which a current session of the terminal device belongs.

The first location information is location information of the terminal device received by the session management function entity 110 in a process of establishing the current session or in a process of handover from a first user plane function entity to a second user plane function entity. The first user plane function entity is configured to serve a session of the terminal device before the handover to the second user plane function entity. The second user plane function entity is configured to serve the current session.

Specifically, the process of establishing the current session in this embodiment of this application includes a process of initially establishing the current session and a process of re-establishing a session to the current session.

For example, the first location information may be carried in a request message sent to the session management function entity for initially establishing the current session, or carried in a message particularly for sending the first location information, or carried in a request message in a process of re-establishing a session to the current session, or carried in a path switching request message. This is not limited in this embodiment of this application.

Step 210a: A mobility management function entity 120 sends second location information of the terminal device to the session management function entity 110, and the session management function entity 110 receives the second location information of the terminal device sent by the mobility management function entity 120.

Step 220a: After receiving the second location information of the terminal device sent by the mobility management function entity 120, if determining that the second location information is not within the session service area, the session management function entity 110 instructs the terminal device to initiate a re-establishment procedure for the current session.

In a possible specific implementation, if the session management function entity 110 determines that the second location information is within the session service area, this procedure ends, and the session management function entity 110 no longer instructs the terminal device to initiate the re-establishment procedure for the current session.

Specifically, in a case of a PDU session, the session service area may also be referred to as a packet data unit session service area (PDU Session Service Area, PSSA). The session service area is a logical concept. The session management function entity 110 may determine the session service area in the following manner:

using, by the session management function entity 110, the first location information of the terminal device as a center, to determine a center location of the session service area, and then determining a size of the session service area.

For example, the size of the session service area may be determined according to a preconfigured policy. For example, a quantity of cells included in the session service area, a quantity of tracking areas (Tracking Area, TA) included in the session service area, and the like are preconfigured.

In addition, the session management function entity 110 may alternatively determine the size of the session service area in the following manner:

determining, by the session management function entity 110, the size of the session service area based on a service area of a user plane function entity serving the current session and/or based on a mobility pattern of the terminal device, where the mobility pattern includes at least one of a moving range of the terminal device, a moving speed of the terminal device, and a moving track of the terminal device.

The PDU session is used as an example. The user plane function entity serving the current session may be an anchor UPF serving the current session. For example, for a terminal device that moves infrequently and is not near a boundary of a service area of the anchor UPF serving the current session, a session service area may be defined as the service area of the anchor UPF serving the current session. For a terminal device that moves infrequently and is near the boundary of the service area of the anchor UPF serving the current session, a smaller session service area may be defined, so that user plane path switching can be performed early after a location of the terminal device is relatively stable. The mobility pattern of the terminal device may be specifically determined based on subscription information, or a historical moving track of the terminal device.

In addition, when defining the session service area, the session management function entity may also consider other factors, to better serve a session of the terminal device.

Figure 3A:
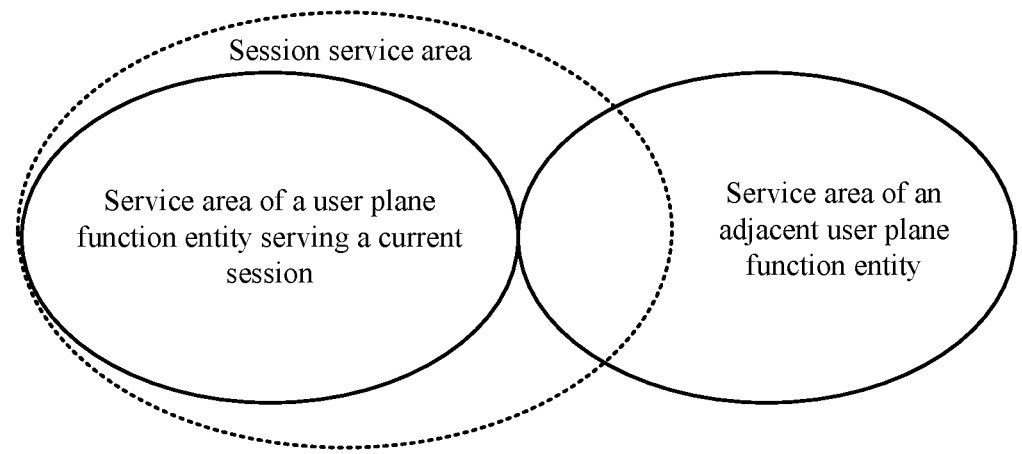
FIG. 3a and FIG. 3b each are a schematic diagram of a relationship between a session service area and a service area of a user plane function entity serving a current session according to an embodiment of this application.
Figure 3B:
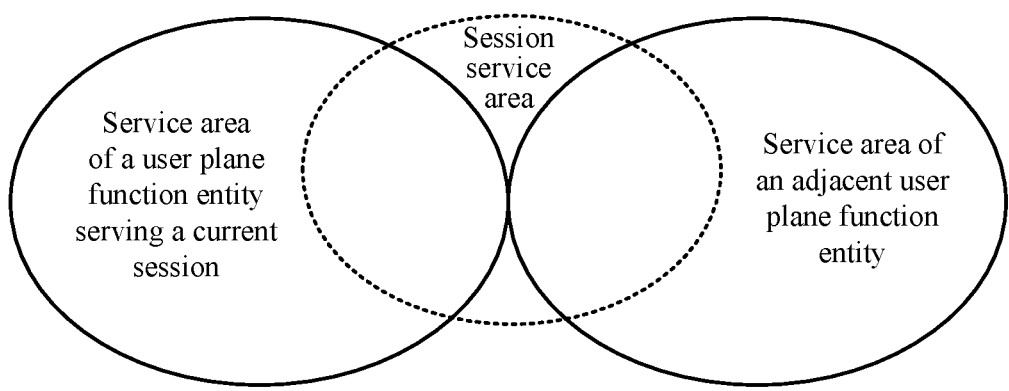

It can be learned from the foregoing manners for determining the session service area that the session management function entity determines different sizes for the session service area in different circumstances. The session service area determined by the session management function entity may include the service area of the user plane function entity serving the current session, as shown in FIG. 3a, or may include only a part of the service area of the user plane function entity serving the current session, as shown in FIG. 3b.

When the session service area includes only a part of the service area of the user plane function entity serving the current session, in step 220a, in addition to determining whether the second location information is within the session service area, a step of determining whether the second location information is within the service area of the user plane function entity serving the current session needs to be added. Specifically, when determining that the second location information is not within the session service area or the service area of the user plane function entity serving the current session, the session management function entity 110 instructs the terminal device to initiate the re-establishment procedure for the current session. Otherwise, this procedure ends.

Figure 2B:
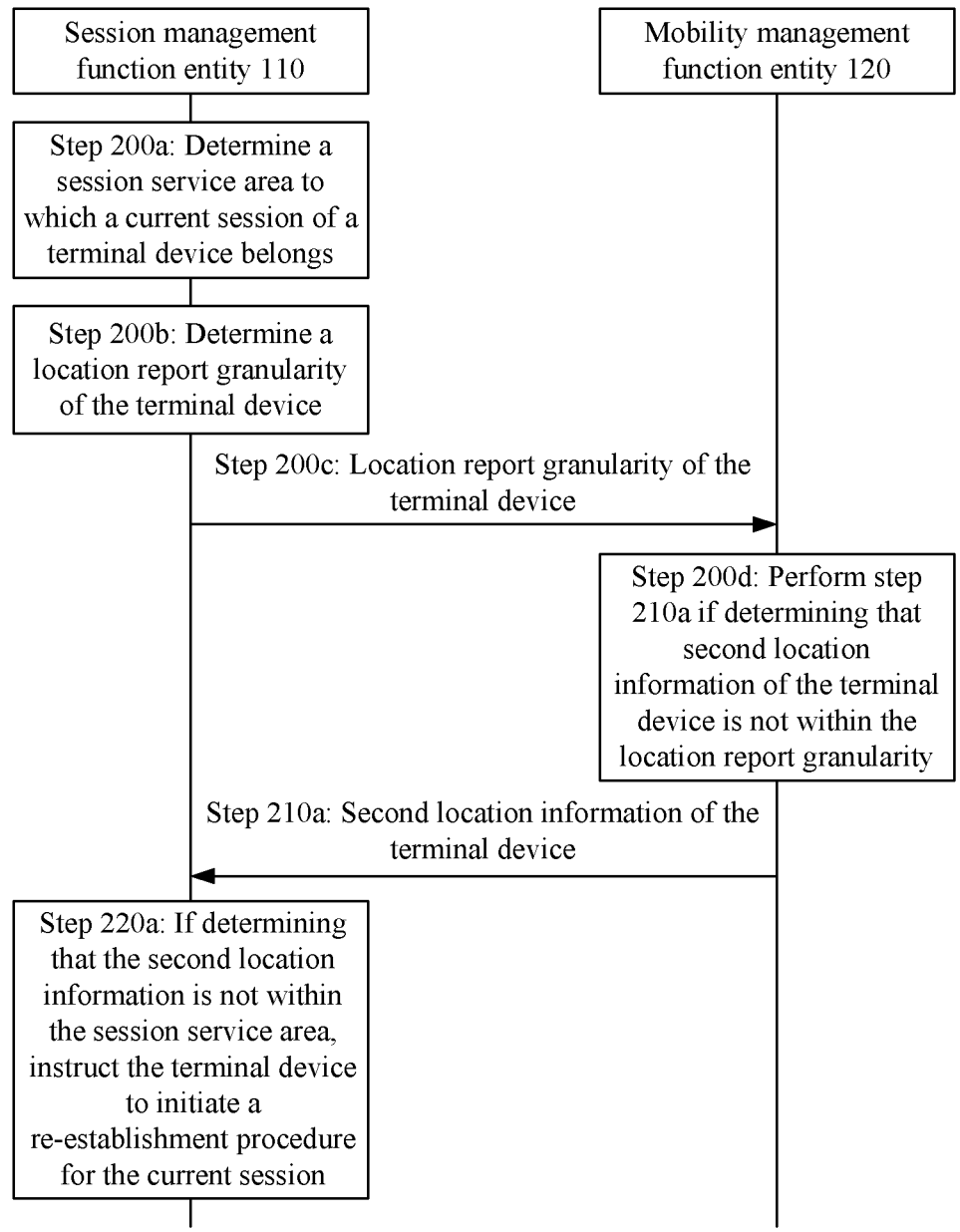

FIG. 2b shows another method for initiating user plane path re-establishment provided in an embodiment of this application. Based on the method for initiating user plane path re-establishment shown in FIG. 2a, a concept of a location report granularity of a terminal device is introduced. Specifically, the method for initiating user plane path re-establishment includes the following steps.

Step 200a: A session management function entity 110 determines, based on first location information of a terminal device, a session service area to which a current session of the terminal device belongs.

The first location information is location information of the terminal device received by the session management function entity 110 in a process of establishing the current session or in a process of handover from a first user plane function entity to a second user plane function entity. The first user plane function entity is configured to serve a session of the terminal device before the handover to the second user plane function entity. The second user plane function entity is configured to serve the current session.

Specifically, the process of establishing the current session in this embodiment of this application includes a process of initially establishing the current session and a process of re-establishing a session to the current session.

Step 200b: The session management function entity 110 determines a location report granularity of the terminal device based on the session service area, where the location report granularity is used to indicate a range for a mobility management function entity 120 to report location information of the terminal device to the session management function entity 110.

Step 200c: The session management function entity 110 sends the location report granularity to the mobility management function entity 120, and the mobility management function entity 120 receives the location report granularity.

Step 200d: The mobility management function entity 120 performs step 210a if determining that second location information of the terminal device is not within the location report granularity.

In a possible specific implementation, if the mobility management function entity 120 determines that the second location information of the terminal device is within the location report granularity, this procedure ends, and the mobility management function entity 120 no longer sends the second location information of the terminal device to the session management function entity 110.

Step 210a: The mobility management function entity 120 sends the second location information of the terminal device to the session management function entity 110.

Step 220a: After receiving the second location information of the terminal device sent by the mobility management function entity 120, if determining that the second location information is not within the session service area, the session management function entity 110 instructs the terminal device to initiate a re-establishment procedure for the current session.

In a possible specific implementation, if the session management function entity 110 determines that the second location information is within the session service area, this procedure ends, and the session management function entity 110 no longer instructs the terminal device to initiate the re-establishment procedure for the current session.

According to the method for initiating user plane path re-establishment shown in FIG. 2b, use of the location report granularity reduces a quantity of signaling for the mobility management function entity to report location information of the terminal device to the session management function entity. Therefore, the mobility management function entity does not need to report location information of the terminal device to every session management function entity each time the mobility management function receives the location information of the terminal.

The following specifically describes the different steps in the methods for initiating user plane path re-establishment in FIG. 2a and FIG. 2b. For explanations of identical steps in FIG. 2a and FIG. 2b, for example, the manners for determining the session service area and the specific implementation for initiating a re-establishment procedure for the current session, and for explanations of step 200a, step 210a, and step 220a, refer to the implementations of the method for initiating user plane path re-establishment shown in FIG. 2a. Details are not described herein again.

Specifically, in step 200b, the session management function entity 110 may determine the location report granularity of the terminal device based on the session service area in the following manners.

In a first manner for determining the location report granularity, the session management function entity obtains at least one location report requirement, where the at least one location report requirement includes at least one piece of area information, and the at least one piece of area information is used to indicate a range in which the terminal device needs to report location information; and then, the session management function entity determines the location report granularity based on the session service area and the at least one piece of area information, where the location report granularity is an intersection of the session service area and the at least one piece of area information.

A PDU session is used as an example. When defining a location report granularity for the PDU session, the session management function entity may further need to consider other location report requirements. For example, a charging requirement also requires that the mobility management function entity report the location information of the terminal device. Generally, the session management function entity selects a finest report granularity of these requirements as the location report granularity for the PDU session. For example, when a charging requirement requires that a PDU session be charged by tracking area identity (Tracking Area Identity, TAI), area information of the charging requirement is one TAI. If the session service area is one group of TAIs, a location report granularity defined by the session management function entity is one TAI instead of one group of TAIs of the session service area.

It should be understood that the session management function entity may obtain at least one location report requirement for the terminal device from at least one of other network element devices, or the session management function entity may locally generate at least one location report requirement based on a requirement of the session management function entity. The other network element devices are devices different from a network element device on which the session management function entity is located.

In a second manner for determining the location report granularity, if determining that no location report requirement is obtained, the session management function entity determines the location report granularity based on only the session service area.

To ensure that a location of the terminal device is within the session service area, the location report granularity is usually not larger than a range of the session service area. A specific relationship between the location report granularity and a size of the session service area may be determined according to a preset policy.

Figure 4A:
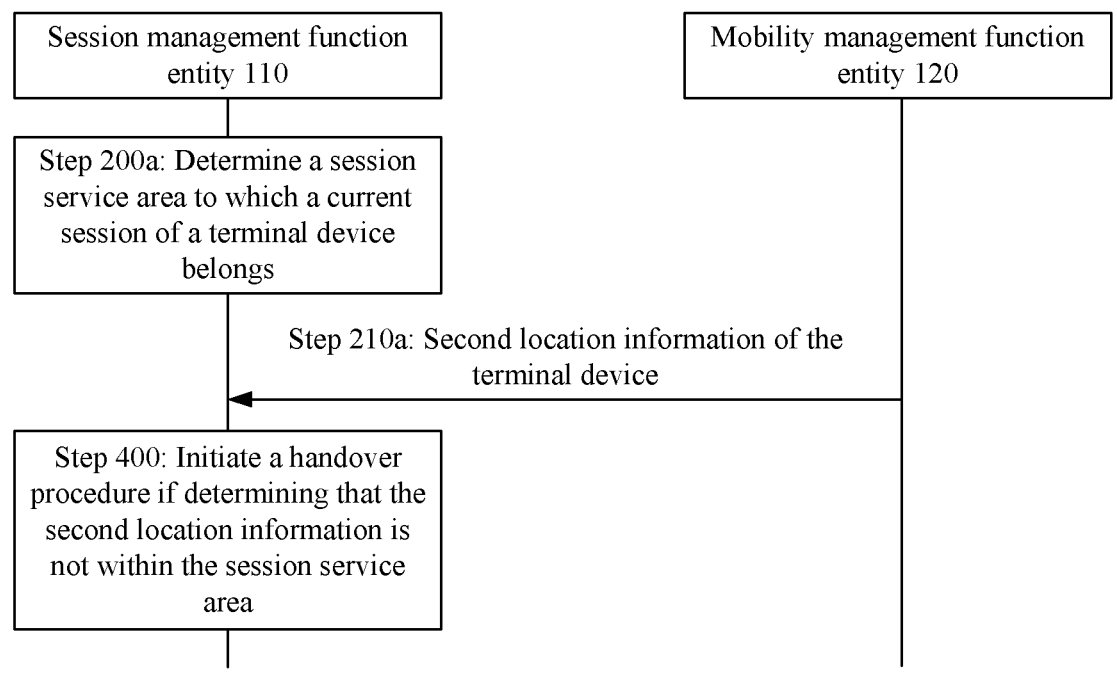
FIG. 4a and FIG. 4b each are a schematic flowchart of a method for initiating user plane path re-establishment according to an embodiment of this application.

As shown in FIG. 4a, an embodiment of this application provides another method for initiating user plane path re-establishment. Step 220a in the method for initiating user plane path re-establishment shown in FIG. 2a is replaced by step 400 in the method for initiating user plane path re-establishment shown in FIG. 4a, and other steps in FIG. 4a are the same as the other steps in FIG. 2a. Therefore, for specific implementations of the method for initiating user plane path re-establishment shown in FIG. 4a, refer to the specific implementations of the method for initiating user plane path re-establishment shown in FIG. 2a. Details are not described herein again.

Figure 4B:
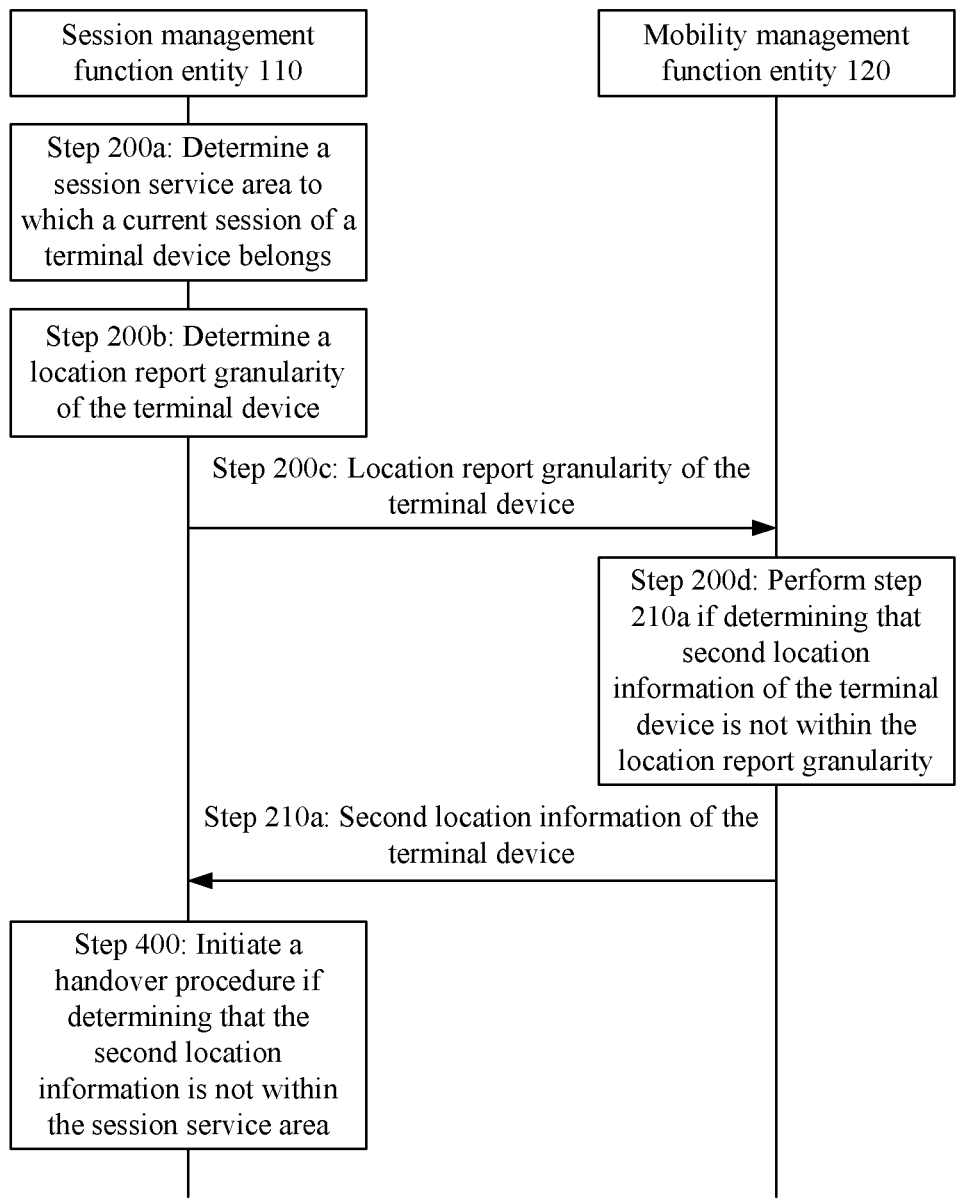

As shown in FIG. 4b, an embodiment of this application further provides a method for initiating user plane path re-establishment. Step 220a in the method for initiating user plane path re-establishment shown in FIG. 2b is replaced by step 400 in the method for initiating user plane path re-establishment shown in FIG. 4b, and other steps in FIG. 4b are the same as the other steps in FIG. 2b. Therefore, for specific implementations of the method for initiating user plane path re-establishment shown in FIG. 4b, refer to the specific implementations of the method for initiating user plane path re-establishment shown in FIG. 2b. Details are not described herein again.

Specifically, in step 400, if determining that the second location information is not within the session service area, the session management function entity 110 initiates a handover procedure. The handover procedure is used to switch from the user plane function entity serving the current session to a target user plane function entity, and the target user plane function entity is configured to serve a session of the terminal device after the handover procedure is completed.

It should be noted that, in step 200a in the methods for initiating user plane path re-establishment shown in FIG. 4a and FIG. 4b, when the first location information is location information of the terminal device received in a process of handover from the first user plane function entity to the second user plane function entity, the user plane function entity serving the current session in the handover procedure initiated by session management function entity 110 in step 400 is the second user plane function entity. When the first location information is location information of the terminal device received in a process of establishing the current session, the user plane function entity serving the current session in the handover procedure initiated by the session management function entity 110 in step 400 is a user plane function entity that serves the current session after the current session is established.

It should be further noted that, in the procedures of initiating user plane path re-establishment shown in FIG. 2a, FIG. 2b, FIG. 4a, and FIG. 4b in the embodiments of this application, in a case of a PDU session, the user plane function entities may be PDU session anchor UPFs. Specifically, the first user plane function entity, the second user plane function entity, the target user plane function entity, the user plane function entity serving the current session, and the like in the procedures of initiating user plane path re-establishment shown in FIG. 2a, FIG. 2b, FIG. 4a and FIG. 4b in the embodiments of this application are different PDU session anchor UPFs.

Figure 5:
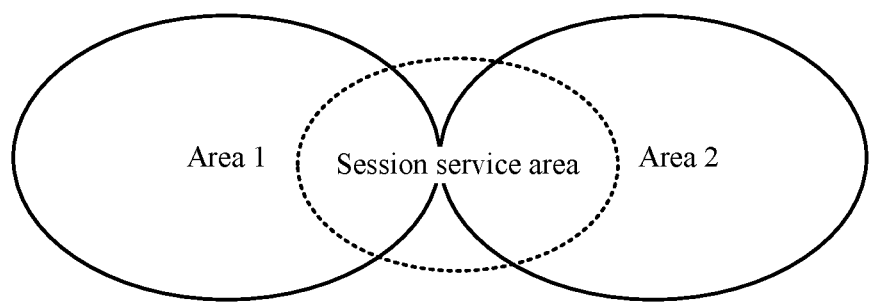
FIG. 5 is a schematic diagram for illustrating a beneficial effect of an embodiment of this application.

A PDU session is used as an example. When the user plane function entities are PDU session anchor UPFs, due to introduction of the session service area in the embodiments of this application, when the terminal device moves back and forth at edges of an area 1 and an area 2 shown in FIG. 5, a ping-pong effect caused by frequent handover between two anchor UPFs is avoided. The area 1 is a service area of one anchor UPF, and the area 2 is a service area of another anchor UPF.

Figure 6:
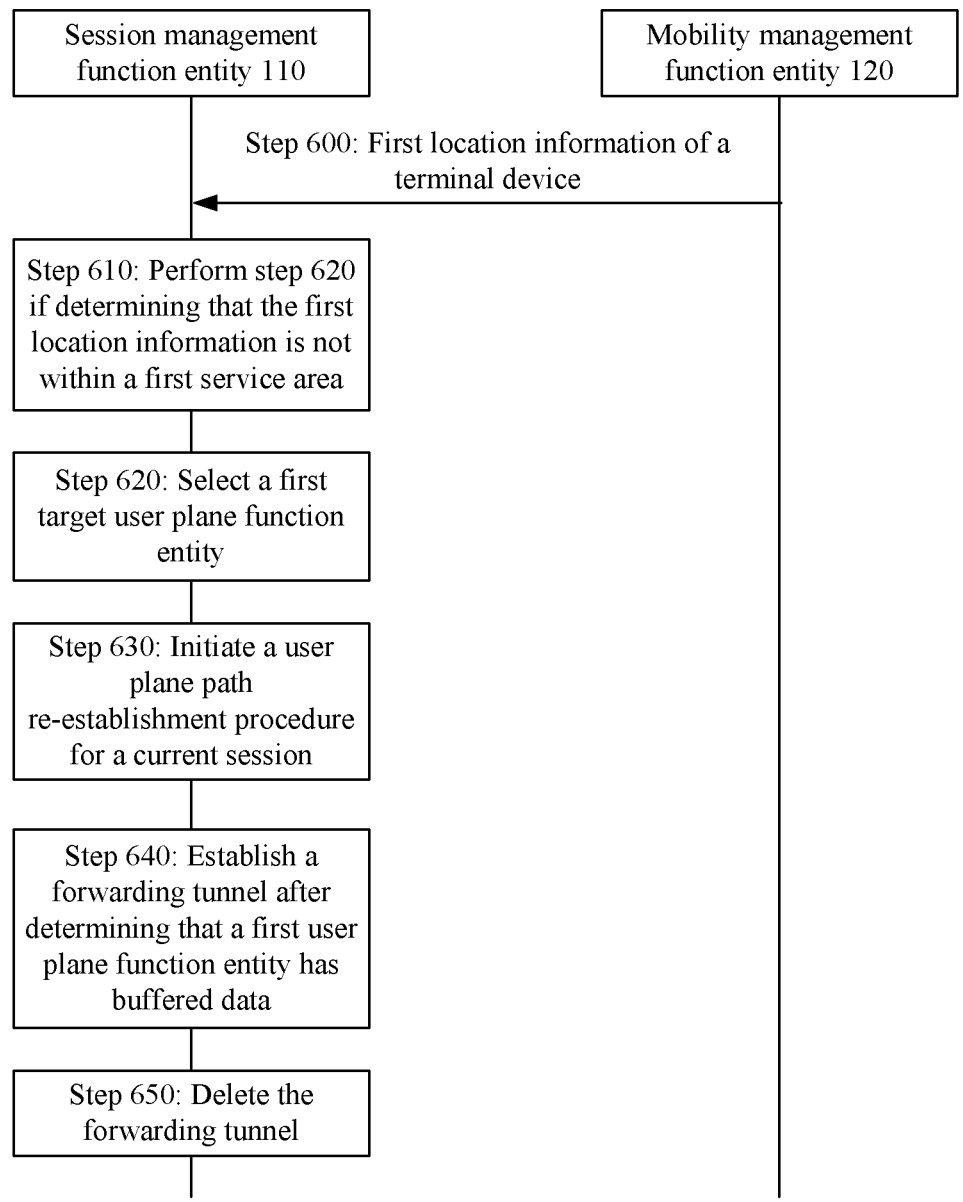
FIG. 6 is a schematic flowchart of a method for re-establishing a user plane path according to an embodiment of this application.

As shown in FIG. 6, an embodiment of this application further provides another method for re-establishing a user plane path, including the following steps.

Step 600: A mobility management function entity 120 sends first location information of a terminal device to a session management function entity, and the session management function entity 110 receives the first location information of the terminal device sent by the mobility management function entity 120.

Step 610: After receiving the first location information of the terminal device sent by the mobility management function entity 120, the session management function entity 110 performs step 620 if determining that the first location information is not within a first service area, where the first service area is a service area of a first user plane function entity, and the first user plane function entity is configured to serve a current session of the terminal device.

In a possible implementation, if the session management function entity 110 determines that the first location information is within the first service area, this procedure ends. In other words, the session management function entity 110 no longer performs step 620 and subsequent steps.

Step 620: The session management function entity 110 selects a first target user plane function entity based on the first location information, where the first target user plane function entity serves a session of the terminal device through a re-established user plane path.

Step 630: The session management function entity 110 initiates a user plane path re-establishment procedure for the current session.

Step 640: The session management function entity 110 establishes a forwarding tunnel after determining that the first user plane function entity has buffered data, where the forwarding tunnel is a tunnel between the first target user plane function entity and the first user plane function entity, so that the first user plane function entity sends the buffered data to the first target user plane function entity through the forwarding tunnel.

Step 650: The session management function entity 110 deletes the forwarding tunnel after receiving a flag that is sent by the first user plane function entity and that indicates completion of sending the buffered data; or the session management function entity 110 starts a forwarding timer after establishing the forwarding tunnel, and deletes the forwarding tunnel after preset duration of the forwarding timer expires.

It should be noted that step 640 and step 650 in the method for initiating user plane path re-establishment shown in FIG. 6 are not mandatory. To be specific, in the method for initiating user plane path re-establishment shown in FIG. 6, only step 600 to step 630 may be performed, or only step 600 to step 640 may be performed, or only step 600 to step 650 may be performed. To perform which steps may be determined based on actual requirements. For example, when the first user plane function entity has no buffered data, only step 600 to step 630 may be performed.

It should be understood that, in the method for initiating user plane path re-establishment shown in FIG. 6 in the embodiments of this application, it is determined whether the location information of the terminal device is within the service area of the user plane function entity serving the current session of the terminal device, to determine whether to select the first target user plane function entity and initiate user plane path re-establishment for the current session. Therefore, when the session management function entity serves current sessions of a plurality of terminal devices, and when some of the terminal devices move out of corresponding user plane function entities serving their current sessions, the session management function entity initiates user plane path re-establishment procedures for the current sessions of these terminal devices, without the need of considering user plane path re-establishment procedures for current sessions of other terminal devices among the current sessions of the plurality of terminal device.

For example, based on the method for initiating user plane path re-establishment shown in FIG. 6 in the embodiments of this application, a location report granularity may be further added, to decrease a quantity of messages that the mobility management function entity needs to report.

Specifically, before step 600, the session management function entity 110 determines a location report granularity of the terminal device based on the first service area, and sends the location report granularity to the mobility management function entity 120. The location report granularity is used to instruct the mobility management function entity 120 to report a range of location information of the terminal device to the session management function entity 110. Before sending the first location information of the terminal device to the session management function entity 110, the mobility management function entity 120 determines whether the first location information of the terminal device is within the location report granularity of the terminal device. If the mobility management function entity 120 determines that the first location information is within the location report granularity of the terminal device, this procedure ends. If the mobility management function entity 120 determines that the first location information of the terminal device is not within the location report granularity, the mobility management function entity 120 performs step 600.

In the method for initiating user plane path re-establishment shown in FIG. 6 in the embodiments of this application, three specific implementations for determining the location report granularity are provided.

In a first specific implementation for determining the location report granularity, the session management function entity may determine the location report granularity of the terminal device based on only the first service area. For example, the location report granularity is set to the first service area or a multiple of the first service area, for example, 0.5 times the first service area. A specific multiple may be correspondingly set based on a mobility pattern of the terminal, for example, a moving speed and a moving range, or may be preconfigured. This is not limited herein. Generally, the location report granularity is not larger than the first service area.

In a second specific implementation for determining the location report granularity, the session management function entity determines, based on second location information of the terminal device, a session service area to which the current session belongs, where the second location information is location information of the terminal device received by the session management function entity in a process of establishing the current session of the terminal device or in a process of handover from a second user plane function entity to a third user plane function entity, the second user plane function entity is configured to serve a session of the terminal device before the handover to the third user plane function entity, and the third user plane function entity is configured to serve the current session. Then, the session management function entity determines the location report granularity of the terminal device based on the first service area and the session service area, where the location report granularity is not larger than an intersection area of the first service area and the session service area.

It should be noted that, in a case of a PDU session, the first user plane function entity may be an N3 UPF, and the second user plane function entity and the third user plane function entity may be anchor UPFs. In the case of a PDU session, when the PDU session is in an SSC mode 1, an anchor UPF stays unchanged. Therefore, this manner for determining the location report granularity is applicable to a PDU session in an SSC mode 2 or an SSC mode 3.

In a third specific implementation for determining the location report granularity, the session management function entity obtains at least one location report requirement, where the at least one location report requirement includes at least one piece of area information, and the at least one piece of area information is used to indicate a range in which the terminal device needs to report location information. Then, the session management function entity determines the location report granularity based on the first service area and the at least one piece of area information, where the location report granularity is an intersection of the first service area and the at least one piece of area information.

Specifically, the session management function entity may obtain at least one location report requirement from other network element devices, or may generate at least one location report requirement based on a requirement of the session management function entity. For example, a charging requirement also requires that the mobility management function entity report the location information of the terminal device. Generally, the session management function entity selects a finest report granularity of these requirements as the location report granularity for the PDU session.

In the method for initiating user plane path re-establishment shown in FIG. 6 in the embodiments of this application, the second specific implementation for determining the location report granularity and the third specific implementation for determining the location report granularity may be combined, to determine the location report granularity. Specifically, the location report granularity is determined based on the first service area, a session service area, and at least one piece of area information. In this case, the location report granularity is not larger than an intersection of the first service area, the session service area, and the at least one piece of area information.

It should be understood that, in the method for initiating user plane path re-establishment shown in FIG. 6 in the embodiments of this application, for a manner for determining the session service area, reference may be made to the manner for determining the session service area in the method for initiating user plane path re-establishment shown in FIG. 2a in the embodiments of this application. Details are not described herein again.

Figure 7:
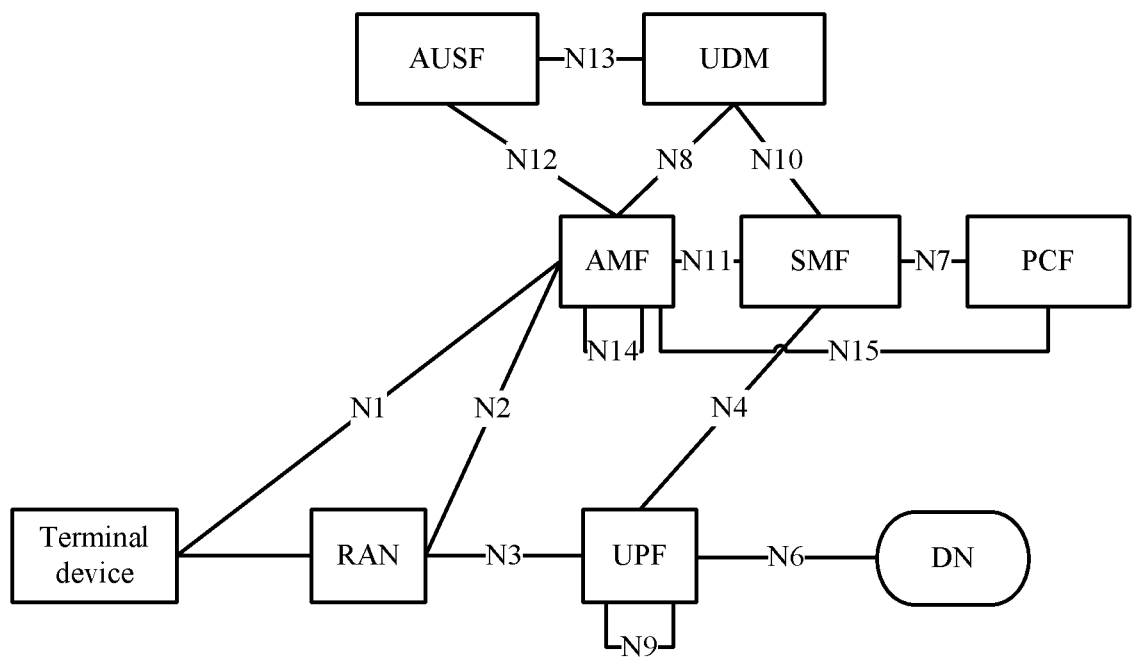
FIG. 7 is a specific schematic diagram of a communications system according to an embodiment of this application.

FIG. 7 shows a communications system. The communications system shown in FIG. 7 is a specific implementation form of the communications system shown in FIG. 1.

The communications system shown in FIG. 7 includes an AMF, an SMF, a UPF, a policy control function (Policy Control function, PCF), a UDM, an authentication server function (Authentication Server Function, AUSF), and a radio access network (Radio Access Network, RAN). The RAN is also referred to as an AN or a data network (Data Network, DN). It should be noted that an N3 UPF and an anchor UPF in the communications system shown in FIG. 7 are integrated into one physical device as different logical function modules and are configured to serve a current PDU session of a terminal device. Therefore, one UPF is used for illustration in FIG. 7. However, it should be noted that the N3 UPF and the anchor UPF may be alternatively integrated into different physical devices, respectively.

According to an existing 5G standard, the terminal device is connected to the AMF through N1, the AMF is connected to the RAN through N2, the N3 UPF is connected to the RAN through N3, the SMF is connected to the N3 UPF and the anchor UPF through N4, the anchor UPF is connected to the DN through N6, the SMF is connected to the PCF through N7, and the AMF is connected to the UDM through N8. An interface between UPFs is N9, and specifically an interface between the N3 UPF and the anchor UPF, an interface between N3 UPFs, and an interface between anchor UPFs are all N9. The SMF is connected to the UDM through N10, the AMF is connected to the SMF through N11, the AUSF is connected to the AMF through N12, the AUSF is connected to the UDM through N13, the AMF is connected to another AMF through N14, and the AMF is connected to the PCF through N15.

It should be noted that the session management function entity in the methods for initiating user plane path re-establishment shown in FIG. 2a and FIG. 2b or FIG. 4a and FIG. 4b in the embodiments of this application is equivalent to the SMF shown in FIG. 7, the mobility management function entity in the methods for initiating user plane path re-establishment shown in FIG. 2a and FIG. 2b or FIG. 4a and FIG. 4b in the embodiments of this application is equivalent to the AMF shown in FIG. 7, and the user plane function entity in the methods for initiating user plane path re-establishment shown in FIG. 2a and FIG. 2b or FIG. 4a and FIG. 4b in the embodiments of this application is equivalent to the UPF shown in FIG. 7. Specifically, the user plane function entity in the method for initiating user plane path re-establishment shown in FIG. 2a or FIG. 2b in the embodiments of this application may be equivalent to a PDU session anchor UPF, the second user plane function entity and the third user plane function entity in the method for initiating user plane path re-establishment shown in FIG. 4a or FIG. 4b are equivalent to PDU session anchor UPFs, and the first user plane function entity and the first target user plane function entity in the method for initiating user plane path re-establishment shown in FIG. 4a or FIG. 4b are equivalent to N3 UPFs.

The following describes the technical solution for initiating user plane path re-establishment for a PDU session in this application by using the communications system shown in FIG. 7 as an example.

Figure 8:
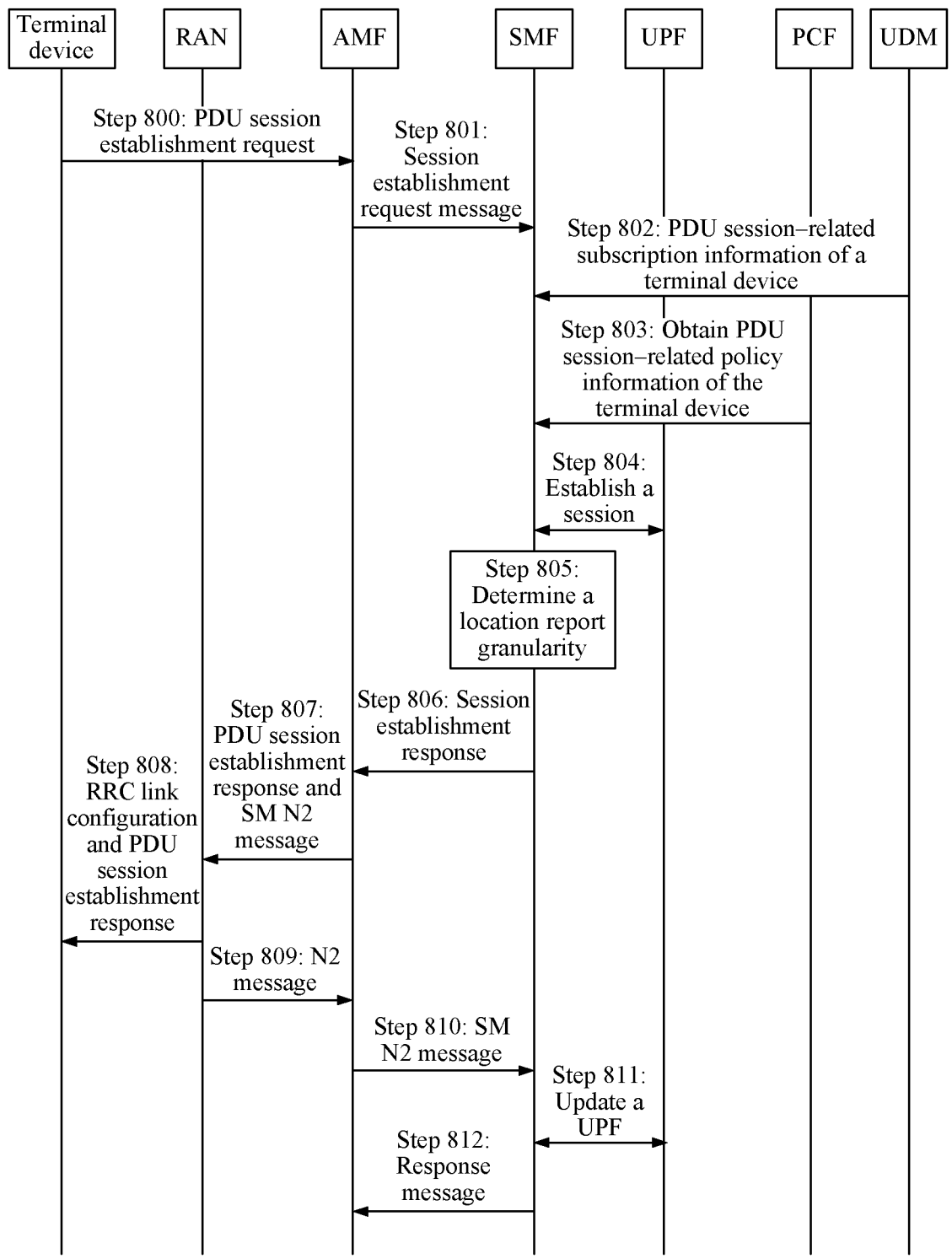
FIG. 8 is a schematic diagram of a process of initially establishing a PDU session or re-establishing a PDU session according to an embodiment of this application.

As shown in FIG. 8, a process of initially establishing a PDU session or re-establishing a PDU session includes the following steps.

Step 800: A terminal device sends a PDU session establishment request to an AMF, to initiate an establishment process for establishing a PDU session, where the PDU session establishment request may be carried in a non access stratum (Non Access Stratum, NAS) message or another message, and the PDU session establishment request includes parameter information required by a network (which is an AMF or an SMF) to establish the PDU session for the terminal device. After receiving the PDU session establishment request, the AMF selects an SMF based on the parameter information included in the PDU session establishment request and location information of the terminal device.

Step 801: The AMF sends a session establishment request message to the selected SMF, where the session establishment request message includes the location information of the terminal device and the parameter information required for establishing the PDU session.

For example, the location information of the terminal device is a current cell ID or TAI of the terminal device, and the location information of the terminal device is obtained from a RAN. In addition, the AMF may also send a TA list to the selected SMF. Then, the SMF selects an N3 UPF and a PDU session anchor UPF based on the parameter information required for establishing the PDU session and the location information of the terminal device that are included in the session establishment request. As shown in FIG. 7, the N3 UPF and the anchor UPF are integrated into one physical device. In actual application, when the N3 UPF and the anchor UPF are separate physical devices, a process of establishing a tunnel between the N3 UPF and the anchor UPF needs to be added to the PDU session establishment procedure. For a specific process, refer to the prior art. Details are not described in this embodiment of this application.

Step 802: The SMF obtains PDU session-related subscription information of the terminal device from a UDM.

Step 803: The SMF obtains PDU session-related policy information of the terminal device from a PCF.

Step 804: The SMF generates an N4 message based on the obtained PDU session-related subscription information and policy information of the terminal device, sends the N4 message to a UPF, to create a user plane resource required for the PDU session, and configures, for the UPF, information required for the PDU session, such as a forwarding rule and a reporting rule.

Step 805: For a PDU session in an SSC mode 1, the SMF determines, based on a service area of a selected N3 UPF, a location report granularity for the PDU session; and for a PDU session in an SSC mode 2 or an SSC mode 3, the SMF determines a PDU session service area (PSSA for short) based on the location information of the terminal device included in the session establishment request message, and then determines, based on a service area of an N3 UPF and the PSSA, a location report granularity for the PDU session of the terminal device. The SMF stores the determined location report granularity.

It should be noted that, when defining the location report granularity for the PDU session, the SMF may also need to consider other requirements such as a charging requirement. If another requirement, for example, a charging requirement, also requires that the AMF report the location information of the terminal device, the SMF selects a finest report granularity of these requirements as the location report granularity for the PDU session. For example, when a charging requirement requires that the PDU session be charged by TAI, a report granularity defined based on a charging policy is one TAI. If the service area of the N3 UPF is one group of TAIs, the location report granularity defined by the SMF is one TAI instead of one group of TAIs of the service area of the UPF.

When the SMF receives no other requirements that affect the location report granularity, the SMF determines the location report granularity based on only the service area of the N3 UPF. Assuming that the service area of the N3 UPF is a subset of the TA list, the report granularity is the service area of the N3 UPF. In this case, when the terminal device moves out of the service area of the N3 UPF, the AMF reports new location information of the terminal device to the SMF.

It should be understood that, for specific implementations for determining the location report granularity, reference may be made to the specific implementations for determining the location report granularity in method for initiating user plane path re-establishment shown in FIG. 6 in the embodiments of this application. Details are not described herein again.

Step 806: The SMF generates a session establishment response message based on the location report granularity, and sends the session establishment response message to the AMF, where the session establishment response message includes the location report granularity and an N2 message, and the N2 message includes an SM N2 message and an SM NAS message.

Step 807: After receiving the session establishment response message, the AMF obtains and stores the location report granularity, generates a PDU session establishment response, and sends the PDU session establishment response NAS message and the SM N2 message to a RAN.

Specifically, the AMF generates the PDU session establishment response based on the SM NAS received from the SMF, and sends, to an AN, both the PDU session establishment response and the SM N2 information received from the SMF. The PDU session establishment response may be carried in a NAS message or other messages.

Step 808: The RAN configures an RRC link based on the SM N2 information message, and sends a PDU session establishment response to the terminal device.

Step 809: The RAN sends an N2 message to the AMF, where the N2 message includes an SM N2 message, and the SM N2 information includes N3 downlink tunnel information of the RAN.

Step 810: The AMF forwards the SM N2 information to the SMF.

Step 811: The SMF updates the UPF.

Step 812: The SMF sends a response message to the AMF.

Figure 9:
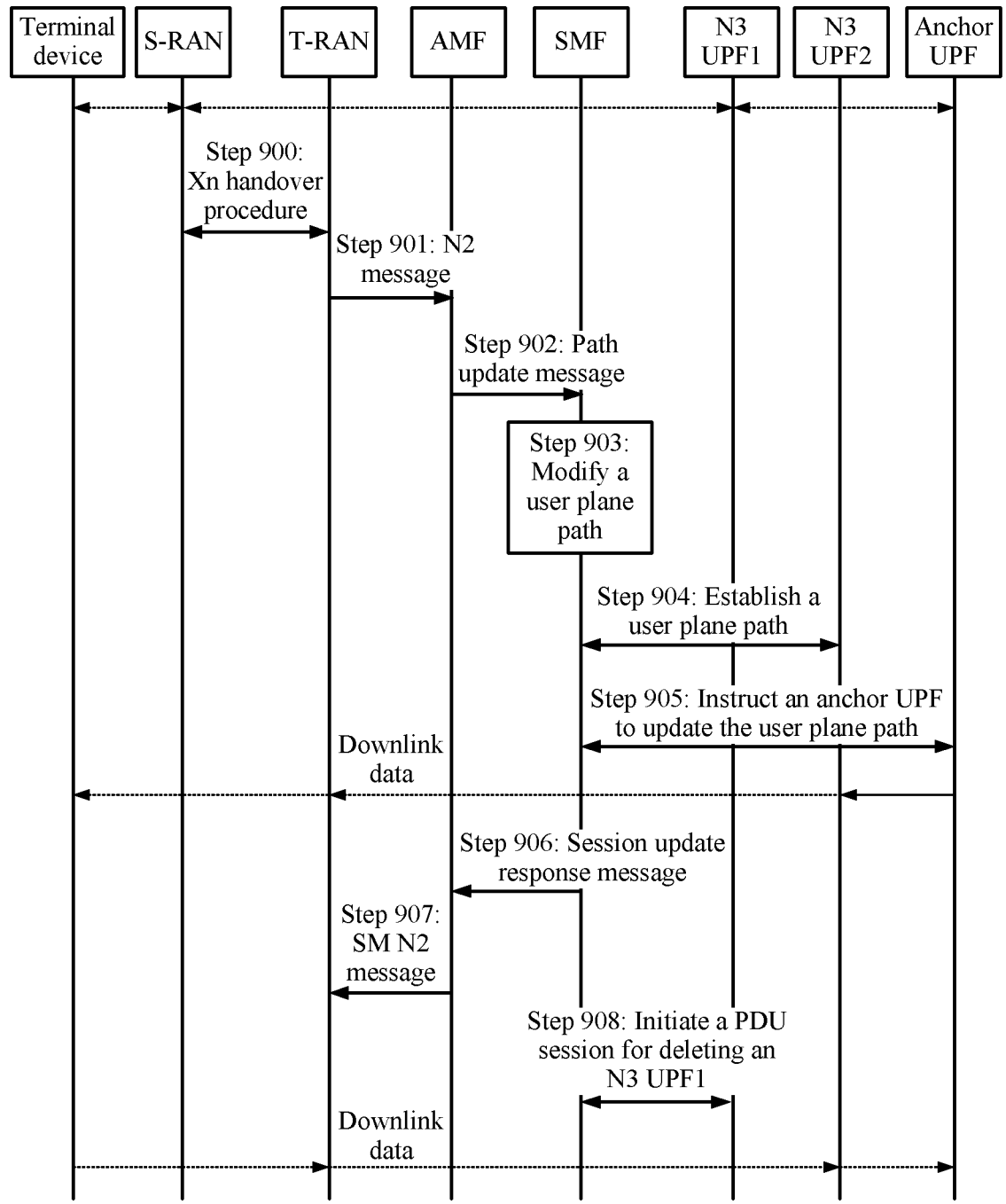
FIG. 9 is a schematic diagram of a user plane path switching method in an Xn handover procedure according to an embodiment of this application.

FIG. 9 shows a user plane path switching method in an Xn handover procedure by using a PDU session in an SSC mode 1 as an example. Assuming that an original user plane path of a terminal device is terminal device↔S-RAN (source RAN)↔N3↔UPF1 H anchor UPF, the user plane path switching method in an Xn handover procedure shown in FIG. 9 includes the following steps.

Step 900: After determining that the terminal device needs to be handed over to a T-RAN (target RAN), the S-RAN performs the Xn-based handover procedure between the S-RAN and the T-RAN. The Xn-based handover procedure may include context transfer, data forwarding, and the like. The T-RAN initiates an N3 tunnel update process after the handover is completed.

Step 901: The T-RAN sends an N2 message to an AMF. The N2 message includes current cell information and/or a current TAI of the terminal device. The N2 message also carries SM N2 information, and the SM N2 information includes downlink tunnel information of the T-RAN corresponding to all active PDU sessions.

Step 902: After receiving the N2 message, the AMF determines that the SM N2 information has included the downlink tunnel information of the T-RAN corresponding to all active PDU sessions, and sends path update messages to SMFs corresponding to all the PDU sessions included in the SM N2 information, where the path update message includes a current location, for example, the cell ID and/or the TAI, of the terminal device.

In addition, the AMF determines, based on a location report granularity for each PDU session that is not included in the SM N2 message and corresponding current location information of the terminal device, whether to send a location update notification message for the terminal device to a corresponding SMF. The AMF sends a session update notification message to each SMF to which a location update notification message needs to be sent, and sends, to the corresponding SMF, the current location information, for example, the cell ID or the TAI, of the terminal device.

Step 903: The SMF determines, based on the current location information of the terminal device and a service area of the N3 UPF1 for the PDU session, whether user plane path modification is required, for example, whether to add a new N3 UPF, switch an N3 UPF, or delete an N3 UPF from the original user plane path.

For a specific manner for the SMF to determine, based on the current location information of the terminal device and the service area of the N3 UPF1 for the PDU session, whether user plane path modification is required, refer to the method for initiating user plane path re-establishment shown in FIG. 6.

In the procedure in this embodiment, it has assumed that the PDU session is in the SSC mode 1. Therefore, the anchor UPF (that is, a PDU session anchor UPF) stays unchanged.

If the SMF determines that a new N3 UPF is required, the SMF selects a new N3 UPF (corresponding to an N3 UPF2 in the figure) based on information such as the location of the UE. When the N3 UPF2 and the anchor UPF are integrated, an actual procedure is deleting the N3 UPF1 in the original user plane path. When the N3 UPF1 and the anchor UPF in the original user plane path are integrated, an actual procedure is adding the N3 UPF2 to the user plane path.

Step 904: The SMF sends, to an N3 UPF2, a message to establish a user plane path (the user plane path is an N9 tunnel and an N3 tunnel).

For a PDU session for which N3 tunnel switching is not required, the SMF establishes only an N9 tunnel and an N3 uplink tunnel.

For a PDU session for which N3 tunnel switching is required, the SMF establishes an N9 tunnel and an N3 tunnel (including an uplink and a downlink).

Step 905: The SMF instructs the anchor UPF to update the user plane path.

Step 906: If the SMF selects a new N3 UPF (for example, the N3 UPF2 shown in FIG. 9, which means that N3 UPF switching has been performed) for the PDU session, the SMF determines a new location report granularity based on a service area of the N3 UPF2. The SMF sends a session update response message to the AMF, where the session update response message includes the new location report granularity.

In addition, the session update response message further carries an SM N2 message, and the SM N2 message includes N3 uplink tunnel information of the N3 UPF2 corresponding to the PDU session.

Step 907: For a PDU session for which N3 tunnel switching is required, the AMF sends, to the T-RAN, an SM N2 message sent by the SMF.

Step 908: The SMF initiates a PDU session for deleting the N3 UPF1. A user plane path after the switching is terminal device↔T-RAN↔N3 UPF2↔anchor UPF.

It should be noted that the user plane path switching method shown in FIG. 9 is also applicable to other connected-mode-based handover procedures, for example, an N2-based handover procedure.

Figure 10:
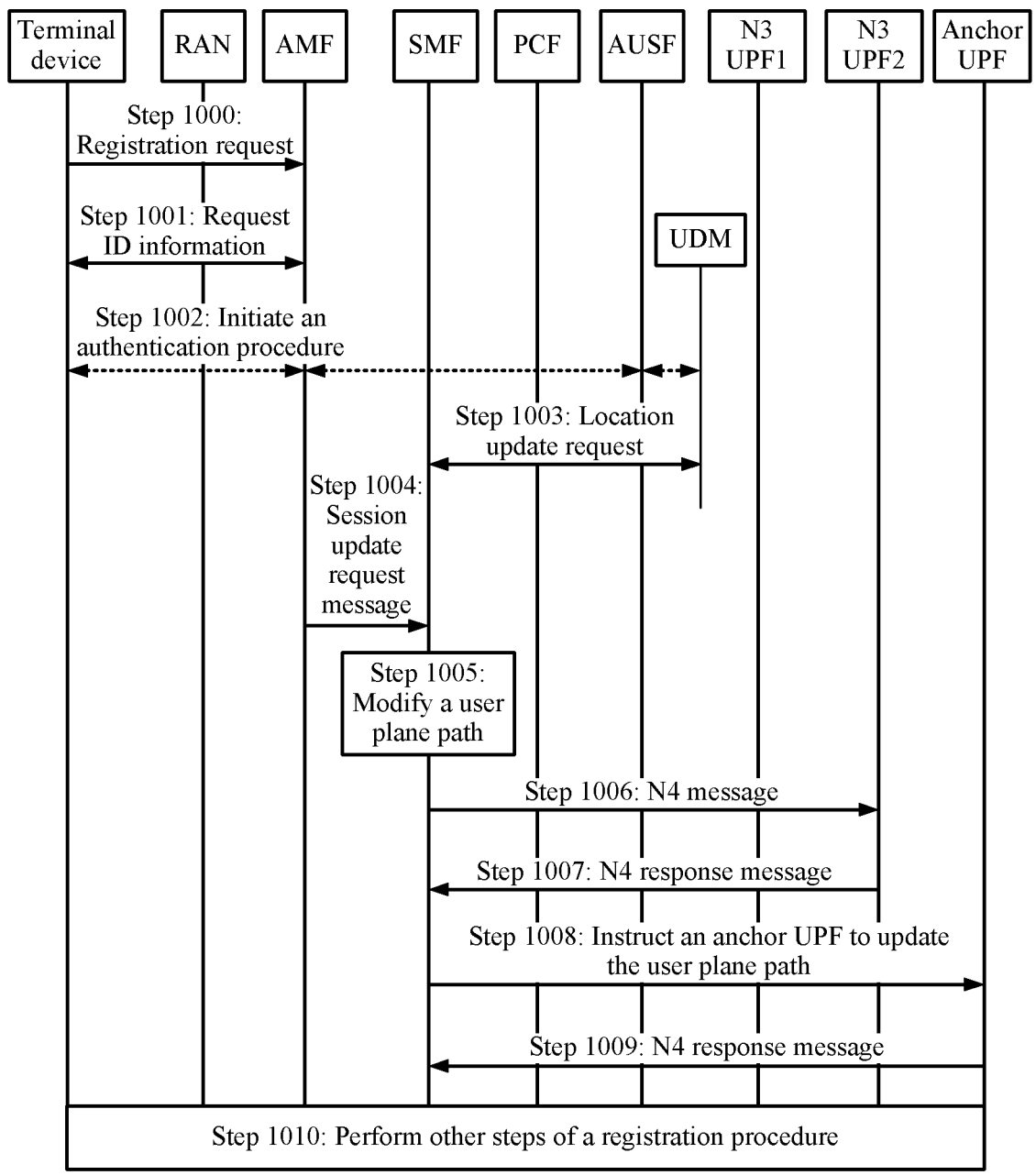
FIG. 10 is a schematic diagram of a user plane path switching procedure in a registration procedure according to an embodiment of this application.

FIG. 10 shows a user plane path switching procedure in a registration procedure. In the user plane path switching procedure in a registration procedure shown in FIG. 10, a PDU session in an SSC mode 1 in the communications system shown in FIG. 7 is used as an example. When a terminal device initiates registration, a type of a specific registration procedure in this embodiment may be periodic registration, or location update registration triggered by moving of the terminal device. Specifically, the user plane path switching procedure shown in FIG. 10 includes the following steps.

Step 1000: The terminal device sends a registration request to an AMF, where a type of the registration request may be a periodic registration request or a location update registration request. The registration request may be carried in a NAS message or other messages. A RAN selects an AMF based on a temporary ID of the terminal device, and sends the registration request and current location information (for example, a cell ID and/or a TAI) of the terminal device to the AMF. The terminal device may request activation of some or all PDU sessions by using the registration request.

Step 1001: If determining that real ID information of the terminal device is not stored, the AMF requests ID information from the terminal device.

Step 1002: The AMF initiates an authentication procedure based on a requirement of the AMF.

Step 1003: The AMF sends a location update request to a UDM, registers the AMF as a serving AMF for the terminal device, and obtains user subscription data from the UDM.

Step 1004: If the terminal device requests activation of a PDU session by using the registration request, the AMF sends a session update request message to an SMF corresponding to the PDU session for which activation has been requested, where the session update request message includes the location information, for example, the cell ID and/or the TAI, of the terminal device.

For PDU sessions for which the terminal device has not requested activation, the AMF checks corresponding location report granularity information of the terminal device and current location information of the terminal device. If the terminal device has currently moved out of a subscribed-to location report granularity for the session, the AMF sends a session update request to the SMF, and the AMF sends a current location (for example, the cell ID and/or the TAI) of the terminal device to the SMF by using this message.

Step 1005: The SMF determines, based on the current location information of the terminal device and a service area of an N3 UPF1 for the PDU session, whether user plane path modification is required, for example, whether to add a new N3 UPF, switch an N3 UPF, or delete an original N3 UPF from a path.

In the procedure in this embodiment, it has assumed that the PDU session is in the SSC mode 1. Therefore, an anchor UPF stays unchanged.

If the SMF determines that a new N3 UPF needs to be selected, the SMF selects a new N3 UPF (an N3 UPF2 shown in FIG. 10) based on information such as the location information of the terminal device. When the N3 UPF2 and the anchor UPF are integrated into one physical device, an actual procedure is deleting the N3 UPF1 from the path. When the N3 UPF1 and the anchor UPF are integrated, an actual procedure is adding the N3 UPF2 to the path.

Step 1006: The SMF sends an N4 message to an N3 UPF2, to establish a user plane path (the user plane path is N3 and N9 tunnels). For a PDU session that does not need to be activated, the SMF establishes only an N9 tunnel and an N3 uplink tunnel. For a PDU session that needs to be activated, the SMF establishes an N9 tunnel and N3 uplink and downlink tunnels.

Step 1007: The N3 UPF2 sends an N4 response message to the SMF.

Step 1008: The SMF instructs an anchor UPF to update the user plane path.

Step 1009: The anchor UPF sends an N4 response message to the SMF.

Step 1010: Perform other steps of the registration procedure. For example, the SMF determines a new location report granularity based on the new N3 UPF (namely, the N3 UPF2) for the PDU session, and the SMF sends the new location report granularity for the PDU session to the AMF. For a PDU session that needs to be activated, the SMF establishes an N3 tunnel for the UE.

Figure 11A:
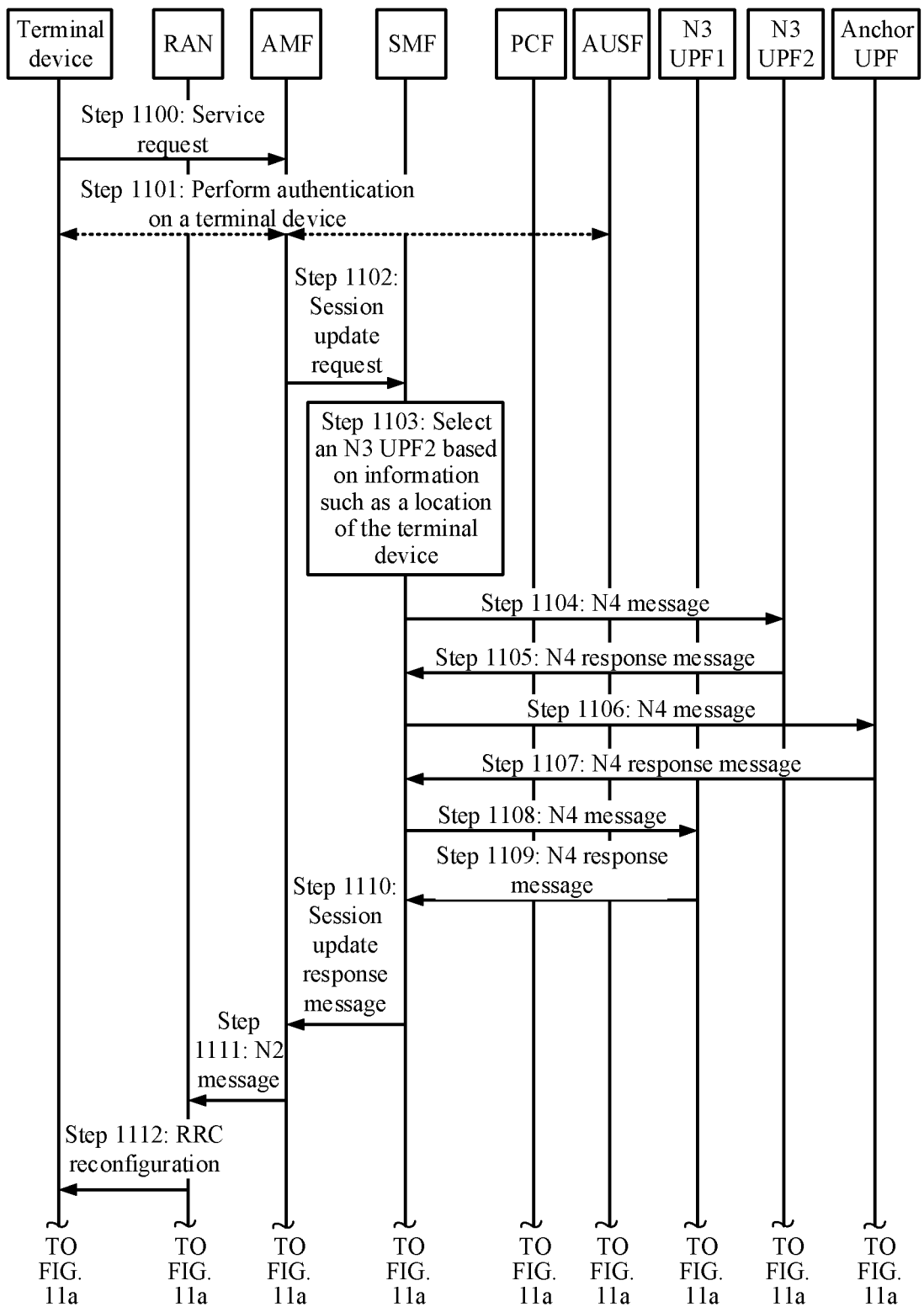
FIG. 11a and FIG. 11b are a schematic diagram of a user plane path switching procedure upon a service request of a terminal device according to an embodiment of this application.
Figure 11B:
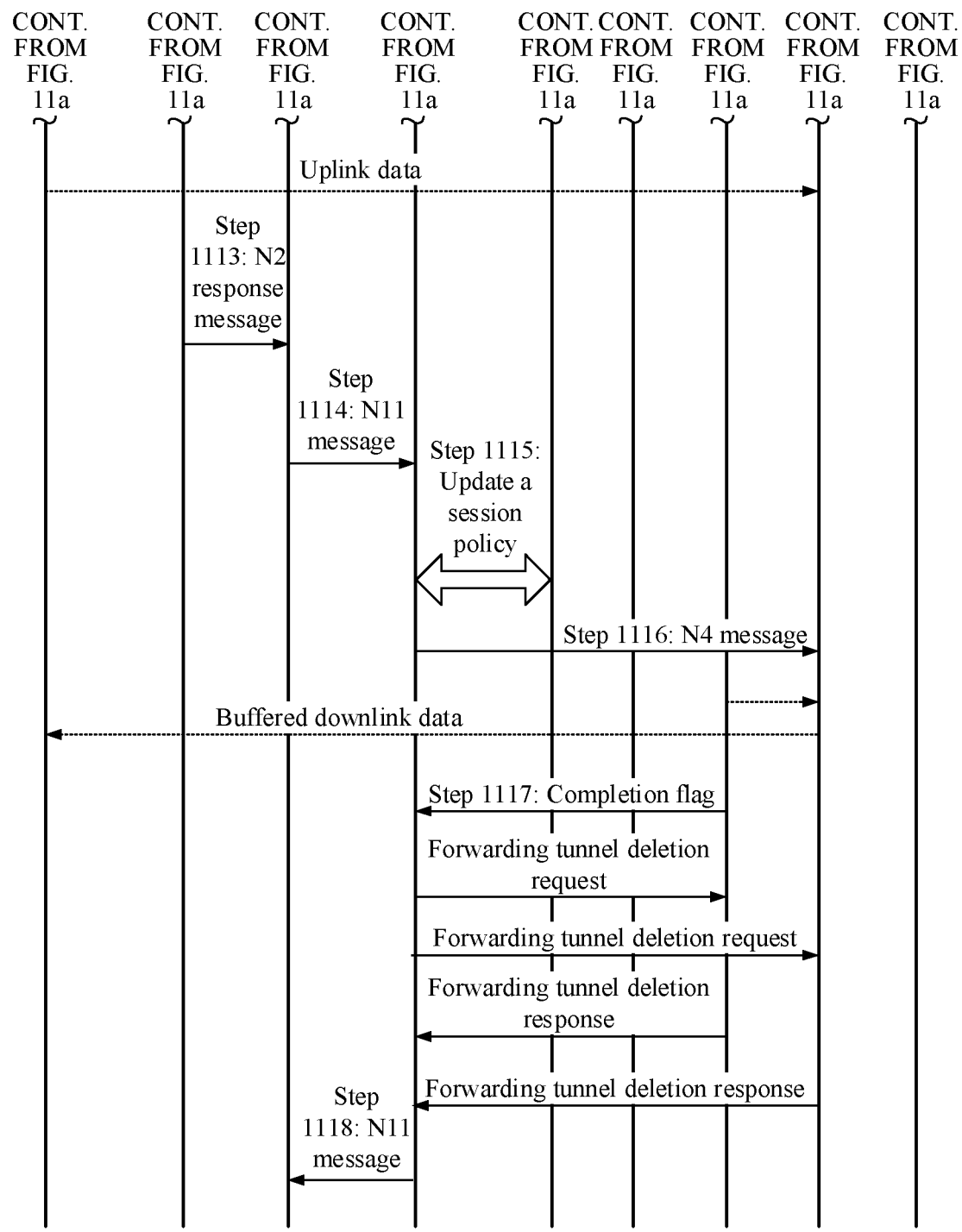

FIG. 11 shows a user plane path switching procedure upon a service request of a terminal device. In the procedure, a PDU session in an SSC mode 1 in the communications system shown in FIG. 7 is used as an example. The procedure specifically includes the following steps.

Step 1100: The terminal device sends a service request to an AMF. When forwarding the service request, a RAN adds current location information, for example, a cell ID and/or a TAI, of the terminal device to the service request. The service request may be carried in a NAS message or other messages. This is not limited herein.

Step 1101: The AMF performs authentication on the terminal device based on a requirement of the AMF.

Step 1102: If the terminal device requests activation of one or more PDU sessions by using the service request, the AMF sends a session update request to an SMF corresponding to the PDU session, and the AMF sends the current location information of the terminal device to the SMF by using the session update request.

In addition, the AMF checks location report granularities for other PDU sessions of the terminal device that do not need to be activated. If the current location information of the terminal device has moved out of ranges of the subscribed-to location report granularities, the AMF sends session update requests to SMFs corresponding to these PDU sessions, to send the current location information (for example, the cell ID and/or the TAI) of the terminal device to the SMFs.

Step 1103: Upon receiving the current location information of the terminal device, the SMF determines, based on the current location information of the terminal device and a service area of an N3 UPF1, whether to add a new N3 UPF, delete an N3 UPF, or switch an N3 UPF for a user plane path. If the SMF determines that a new N3 UPF is required, the SMF selects an N3 UPF2 based on information such as the location of the terminal device.

Step 1104: The SMF sends an N4 message to the N3 UPF2, to establish an N9 tunnel between the N3 UPF2 and an anchor UPF. For a PDU session that does not need to be activated, the SMF establishes only an N9 tunnel and an N3 uplink tunnel. For a PDU session that needs to be activated, the SMF establishes an N9 tunnel and N3 uplink and downlink tunnels. If the service request is network-triggered, for the PDU session that needs to be activated, the N4 message is also used to establish a forwarding tunnel between the N3 UPF1 and the N3 UPF2.

Step 1105: The N3 UPF2 sends an N4 response message to the SMF.

Step 1106: The SMF sends an N4 message to the anchor UPF, to update the user plane path (the N9 tunnel) for the PDU session.

Step 1107: The anchor UPF sends an N4 response message to the SMF.

Step 1108: If the service request is network-triggered, the SMF sends an N4 message to the N3 UPF1, to establish a forwarding tunnel between the N3 UPF1 and the N3 UPF2, where the N4 message is also used to delete an N9 tunnel between the N3 UPF1 and the anchor UPF.

Step 1109: The N3 UPF1 sends an N4 response message to the SMF.

Step 1110: If an N3 UPF change has occurred, the SMF determines a new location report granularity for the PDU session based on a service range of a new N3 UPF (for example, the N3 UPF2 in FIG. 11).

The SMF sends a session update response message to the AMF, where the message includes the new location report granularity for the PDU session. For all to-be-activated PDU sessions, the message further includes SM N2 information, and the SM N2 information includes N3 uplink tunnel information of the N3 UPF2.

For a PDU session whose user plane path is changed (in other words, N3 UPF switching has been performed) and that does not need to be activated, steps 1112 to 1118 do not need to be performed.

Step 1111: The AMF sends an N2 message to the RAN, where the N2 message includes an SM N2 message sent by the SMF.

Step 1112: The RAN performs RRC reconfiguration with the terminal device, to allocate a resource to the PDU session that is just activated. Uplink data is sent from the RAN to the N3 UPF2.

Step 1113: The RAN sends an N2 response message to the AMF, where the N2 response message carries SM N2 information, and the SM N2 message includes N3 downlink tunnel information of the RAN.

Step 1114: The AMF sends an N11 message to the SMF, where the N11 message includes the SM N2 information sent by the RAN.

Step 1115: The SMF updates a session policy.

Step 1116: The SMF sends an N4 message to the N3 UPF2, to update an N3 tunnel of the N3 UPF2. Downlink data is sent from the N3 UPF2 to the RAN, and downlink forwarding data is sent from the N3 UPF1 to the RAN by using the N3 UPF2.

Step 1117: The N3 UPF1 sends a completion flag to the SMF after sending a last piece of buffered data is completed. The SMF sends a forwarding tunnel deletion request—N4 message to the N3 UPF1 and the N3 UPF2, to instruct the N3 UPF1 and the N3 UPF2 to delete the forwarding tunnel. Alternatively, the SMF sets a forwarding timer locally, and after the forwarding timer expires, the SMF sends a forwarding tunnel deletion request—N4 message to the N3 UPF1 and the N3 UPF2, to instruct the N3 UPF1 and the N3 UPF2 to delete the forwarding tunnel. After receiving the forwarding tunnel deletion request, the N3 UPF1 and the N3 UPF2 delete the forwarding tunnel; and the N3 UPF1 and the N3 UPF2 each send a forwarding tunnel deletion response to the SMF, to notify the SMF of completion of deleting the forwarding tunnel. The forwarding tunnel deletion request and the forwarding tunnel deletion response may be carried in N4 messages or other messages. This is not limited herein.

Step 1118: The SMF sends an N11 response message to the AMF. Step 1118 may be performed previous to step 1117.

Figure 12:
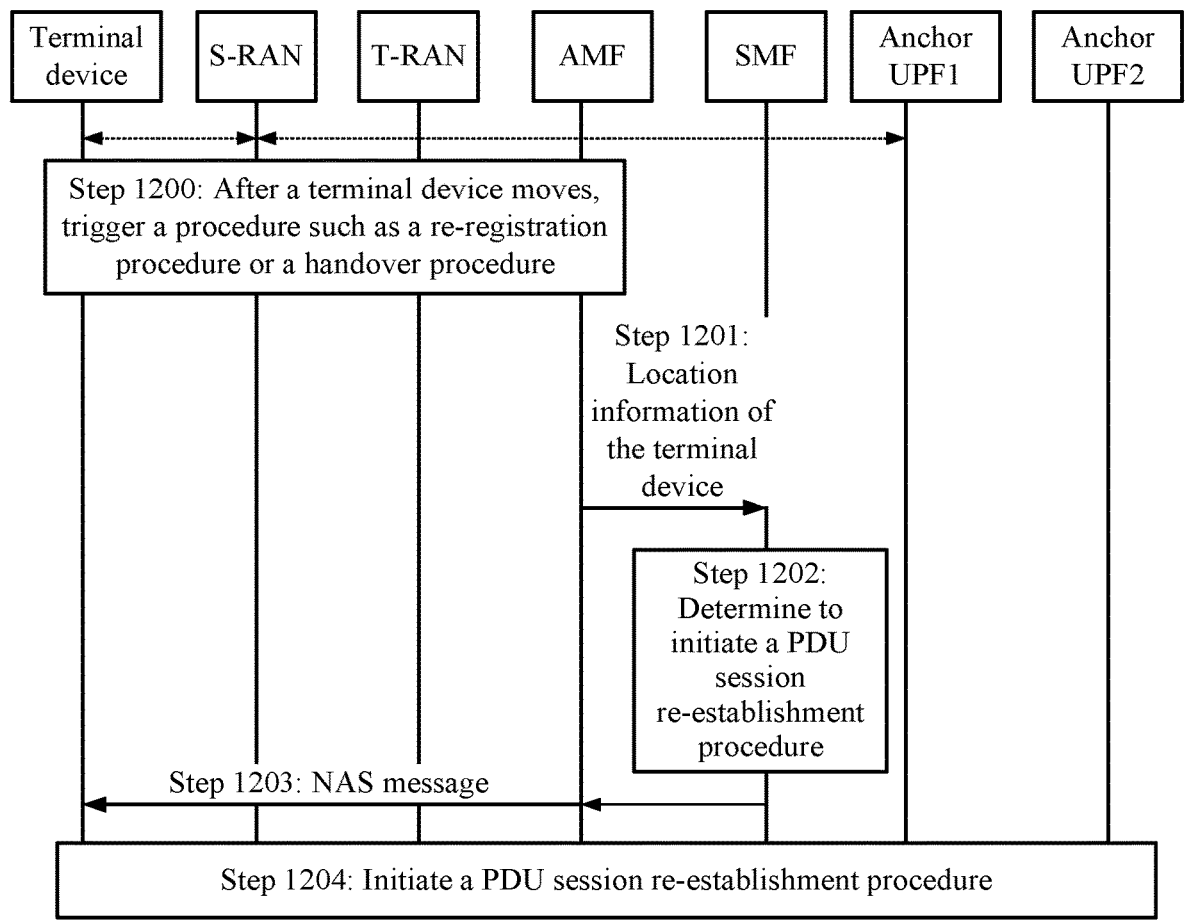
FIG. 12 is a schematic diagram of a PDU session re-establishment procedure according to an embodiment of this application.

FIG. 12 shows a PDU session re-establishment procedure. In the procedure, a PDU session in an SSC mode 2 or an SSC mode 3 in the communications system shown in FIG. 7 is used as an example. After a terminal device moves, an SMF determines a PDU session service area (also referred to as a PSSA) based on after-move location information of the terminal device. For a specific manner for determining the PSSA, refer to the manner for determining the session service area in the method for initiating user plane path re-establishment shown in FIG. 2a in the embodiments of this application. Details are not described herein again. Specifically, the PDU session re-establishment procedure includes the following steps:

Step 1200: Before the terminal device moves, a PDU session anchor of the terminal device is an anchor UPF1. After the terminal device moves, a procedure such as a re-registration procedure or a handover procedure may be triggered, and the terminal device, whether in an idle mode or a connected mode, may initiate a service request (Service request, SR) process to trigger activation of a PDU session.

Step 1201: In the re-registration procedure or the handover procedure, an AMF determines, based on a location report granularity of the terminal device, whether to notify an SMF of location information of the terminal device. If the AMF determines to notify an SMF of location information of a terminal device after determining a location report granularity for a PDU session of the terminal device, the AMF sends the location information of the terminal device to the SMF. The location information of the terminal device may be sent together with other N11 messages to the SMF.

Step 1202: The SMF determines whether the location information of the terminal device is within the PSSA for the PDU session, to determine whether to initiate a PDU session re-establishment procedure. The SMF performs step 1203 if determining to instruct the terminal device to initiate a PDU session re-establishment procedure. The PDU session re-establishment procedure means establishing a PDU session in a same data network.

Step 1203: The SMF sends a NAS message to the terminal device, to instruct the UE to initiate PDU session re-establishment, where the NAS message is sent by using the AMF.

Step 1204: The terminal device initiates PDU session re-establishment after receiving the NAS message sent by the SMF. An anchor for a new PDU session is an anchor UPF2. For a PDU session in the SSC mode 2, the terminal device releases an original PDU session before the PDU session re-establishment. For a PDU session in the SSC mode 3, the terminal device releases an original PDU session based on a requirement after the new PDU session is established.

Figure 13A:
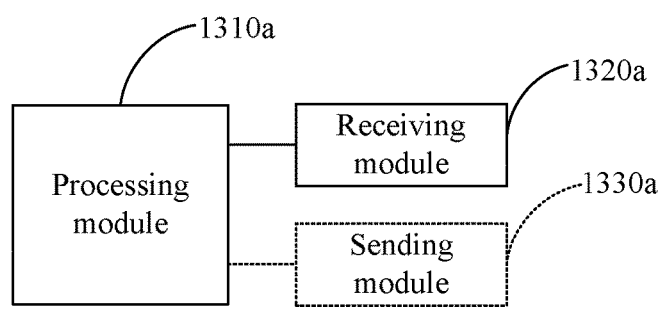
FIG. 13a is a schematic structural diagram of an apparatus for initiating user plane path re-establishment according to an embodiment of this application.
Figure 14A:
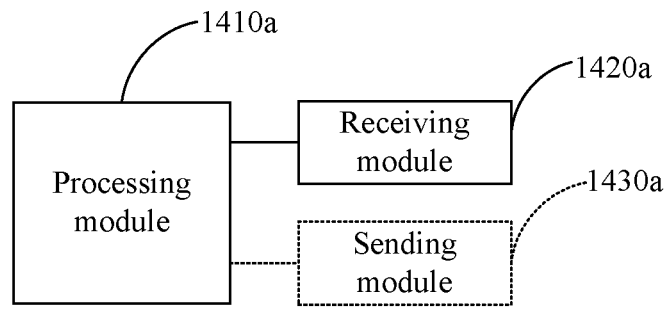
FIG. 14a is a schematic structural diagram of an apparatus for initiating user plane path re-establishment according to an embodiment of this application.

Based on a same idea, the embodiments of this application further provide apparatuses for initiating user plane path re-establishment shown in FIG. 13a and shown in FIG. 14a. The apparatus shown in FIG. 13a in the embodiments of this application is corresponding to the methods for initiating user plane path re-establishment shown in FIG. 2a and FIG. 2b in the embodiments of this application. Therefore, for implementations of the apparatus shown in FIG. 13a in the embodiments of this application, refer to the implementations of the methods for initiating user plane path re-establishment shown in FIG. 2a and FIG. 2b. Details are not described herein again. The apparatus shown in FIG. 14a in the embodiments of this application is corresponding to the methods for initiating user plane path re-establishment shown in FIG. 4a and FIG. 4b in the embodiments of this application. Therefore, for implementations of the apparatus shown in FIG. 14a in the embodiments of this application, refer to the implementations of the methods for initiating user plane path re-establishment shown in FIG. 4a and FIG. 4b. Details are not described herein again.

As shown in FIG. 13a, an embodiment of this application provides an apparatus for initiating user plane path re-establishment, including a processing module 1310a and a receiving module 1320a.

The processing module 1310a is configured to determine, based on first location information of a terminal device, a session service area to which a current session of the terminal device belongs. The first location information is location information of the terminal device received by a session management function entity in a process of establishing the current session or in a process of handover from a first user plane function entity to a second user plane function entity. The first user plane function entity is configured to serve a session of the terminal device before the handover to the second user plane function entity. The second user plane function entity is configured to serve the current session.

The receiving module 1320a is configured to receive second location information of the terminal device sent by a mobility management function entity.

The processing module 1310a is further configured to: when determining that the second location information received by the receiving module is not within the session service area, instruct the terminal device to initiate a re-establishment procedure for the current session or initiate a handover procedure. The handover procedure is used to switch from the user plane function entity serving the current session to a target user plane function entity. The target user plane function entity is configured to serve a session of the terminal device after the handover procedure is completed.

For example, the session service area includes a service area of the user plane function entity serving the current session.

For example, when the session service area includes a part of the service area of the user plane function entity serving the current session, the processing module 1310a is configured to: when determining that the second location information is neither within the session service area nor within the service area of the user plane function entity serving the current session, instruct the terminal device to initiate a re-establishment procedure for the current session or initiate a handover procedure.

Specifically, the processing module 1310a may determine the session service area in the following implementation manner:

using the first location information of the terminal device as a center, to determine a center location of the session service area; and determining a size of the session service area.

For example, the processing module 1310a may determine the size of the session service area in the following manner:

determining the size of the session service area based on the service area of the user plane function entity serving the current session and/or based on a mobility pattern of the terminal device, where the mobility pattern includes at least one of a moving range of the terminal device, a moving speed of the terminal device, and a moving track of the terminal device.

In a possible implementation, after determining the session service area, the processing module 1310a determines a location report granularity of the terminal device based on the session service area, where the location report granularity is used to indicate a range for the mobility management function entity to report location information of the terminal device to the session management function entity; and a sending module 1330 of the apparatus sends the location report granularity determined by the processing module to the mobility management function entity.

Specifically, before determining the location report granularity based on the session service area, the processing module 1310a obtains at least one location report requirement, where the at least one location report requirement includes at least one piece of area information, and the at least one piece of area information is used to indicate a range in which the terminal device needs to report location information; and then determines the location report granularity based on the session service area and the at least one piece of area information, where the location report granularity is an intersection of the session service area and the at least one piece of area information.

It should be understood that the foregoing specific unit division is merely an example and constitutes no limitation on this application.

Figure 13B:
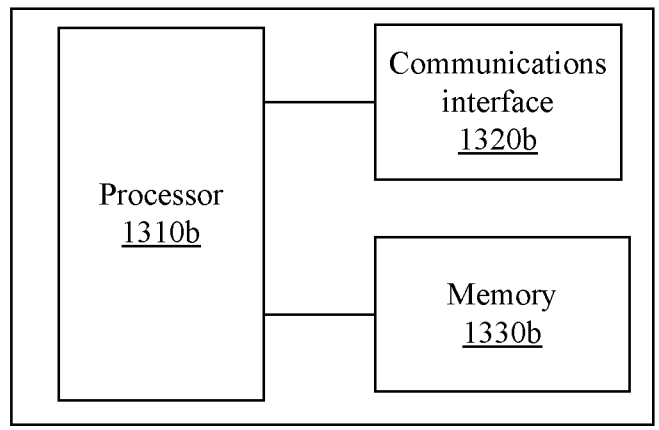
FIG. 13b is a schematic diagram of a hardware structure of a session management function device according to an embodiment of this application.

When the apparatus for initiating user plane path re-establishment shown in FIG. 13a exists as a separate physical device, a hardware structure of the apparatus may be a session management function device shown in FIG. 13b. The processing module 1310a shown in FIG. 13a may be implemented by a processor 1310b, and the receiving module 1320a and the sending module 1330a may be implemented by a communications interface 1320b. In addition, the session management function device shown in FIG. 13b further includes a memory 1330b. The memory 1330b is configured to store a software program, data information sent and received through the communications interface 1320b, and the like. The processor 1310b is configured to: read the software program and the data that are stored in the memory 1330b, and implement the method shown in FIG. 2a or FIG. 2b in the embodiments of this application.

The processor 1310b may be a general-purpose central processing unit (Central Processing Unit, CPU), a microprocessor, an application-specific integrated circuit (Application-Specific Integrated Circuit, ASIC), or one or more integrated circuits, and is configured to perform related operations, to implement the technical solutions provided in the embodiments of this application.

It should be noted that, although only the processor 1310b, the communications interface 1320b, and the memory 1330b are shown for the session management function device shown in FIG. 13b, in a specific implementation process, a person skilled in the art should understand that the session management function device also includes other components mandatory for implementing normal running. Further, based on a specific requirement, a person skilled in the art should understand that the session management function device may further include hardware components for implementing other additional functions. In addition, a person skilled in the art should understand that the session management function device may alternatively include only components or modules mandatory for implementing the embodiments of this application, instead of including all components shown in FIG. 13b.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include a magnetic disk, an optical disc, a read-only memory (Read-Only Memory, ROM), or a random access memory (Random Access Memory, RAM).

As shown in FIG. 14a, an embodiment of this application provides an apparatus for initiating user plane path re-establishment, including a processing module 1410a and a receiving module 1420a.

The receiving module 1420a is configured to receive first location information of a terminal device sent by a mobility management function entity.

The processing module 1410a is configured to: when determining that the first location information received by the receiving module 1420a is not within a first service area, select a first target user plane function entity based on the first location information, and initiate a user plane path re-establishment procedure for a current session.

The first service area is a service area of a first user plane function entity, the first user plane function entity is configured to serve the current session of the terminal device, and the first target user plane function entity serves a session of the terminal device through a re-established user plane path.

In a possible implementation, before the receiving module 1420a receives the first location information of the terminal device sent by the mobility management function entity, the processing module 1410a determines a location report granularity of the terminal device based on the first service area, where the location report granularity is used to indicate a range for the mobility management function entity to report location information of the terminal device to a session management function entity; and a sending module 1430a of the apparatus is configured to send the location report granularity to the mobility management entity.

For example, before determining the location report granularity based on the first service area, the processing module 1410a determines, based on second location information of the terminal device, a session service area to which the current session belongs, and determines the location report granularity of the terminal device based on the first service area and the session service area, where the second location information is location information of the terminal device received by the session management function entity in a process of establishing the current session of the terminal device or in a process of handover from a second user plane function entity to a third user plane function entity, the second user plane function entity is configured to serve a session of the terminal device before the handover to the third user plane function entity, the third user plane function entity is configured to serve the current session, and the location report granularity is not larger than an intersection area of the first service area and the session service area.

For example, before determining the location report granularity based on the first service area, the processing module 1410a obtains at least one location report requirement, where the at least one location report requirement includes at least one piece of area information, and the at least one piece of area information is used to indicate a range in which the terminal device needs to report location information; and determines the location report granularity based on the first service area and the at least one piece of area information, where the location report granularity is an intersection of the first service area and the at least one piece of area information.

In a possible implementation, after initiating the user plane path re-establishment for the current session, the processing module 1410a establishes a forwarding tunnel if determining that the first user plane function entity has buffered data, where the forwarding tunnel is a tunnel between the first target user plane function entity and the first user plane function entity, so that the first user plane function entity sends the buffered data to the first target user plane function entity through the forwarding tunnel.

In addition, for example, after establishing the forwarding tunnel, the processing module 1410a deletes the forwarding tunnel after determining that the receiving module has received a flag that is sent by the first user plane function entity and that indicates completion of sending the buffered data; or starts a forwarding timer after establishing the forwarding tunnel, and deletes the forwarding tunnel after preset duration of the forwarding timer expires.

It should be understood that the foregoing specific unit division is merely an example and constitutes no limitation on this application.

Figure 14B:
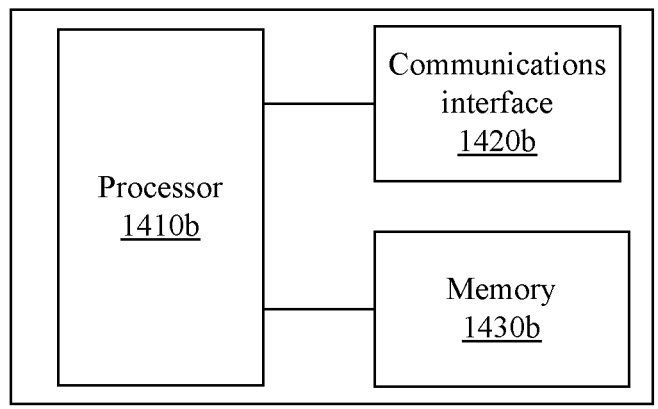
FIG. 14b is a schematic diagram of a hardware structure of a session management function device according to an embodiment of this application.

When the apparatus for initiating user plane path re-establishment shown in FIG. 14a exists as a separate physical device, a hardware structure of the apparatus may be a session management function device shown in FIG. 14b. The processing module 1410a shown in FIG. 14a may be implemented by a processor 1410b, and the receiving module 1420a and the sending module 1430a may be implemented by a communications interface 1420b. In addition, the session management function device shown in FIG. 14b further includes a memory 1430b. The memory 1430b is configured to store a software program, data information sent and received through the communications interface 1420b, and the like. The processor 1410b is configured to: read the software program and the data that are stored in the memory 1430b, and implement the method shown in FIG. 2a or FIG. 2b in the embodiments of this application.

The processor 1410b may be a general-purpose central processing unit (Central Processing Unit, CPU), a microprocessor, an application-specific integrated circuit (Application-Specific Integrated Circuit, ASIC), or one or more integrated circuits, and is configured to perform related operations, to implement the technical solutions provided in the embodiments of this application.

It should be noted that, although only the processor 1410b, the communications interface 1420b, and the memory 1430b are shown for the session management function device shown in FIG. 14b, in a specific implementation process, a person skilled in the art should understand that the session management function device also includes other components mandatory for implementing normal running. Further, based on a specific requirement, a person skilled in the art should understand that the session management function device may further include hardware components for implementing other additional functions. In addition, a person skilled in the art should understand that the session management function device may alternatively include only components or modules mandatory for implementing the embodiments of this application, instead of including all components shown in FIG. 14b.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include a magnetic disk, an optical disc, a read-only memory (Read-Only Memory, ROM), or a random access memory (Random Access Memory, RAM).

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of processes and/or blocks in the flowcharts and/or the block diagrams. These computer program instructions may be provided for a processor of a general-purpose computer, a dedicated computer, an embedded processor, or any other programmable data processing device to generate a machine, so that the instructions executed by the processor of the computer or the any other programmable data processing device generate an apparatus for implementing a specific function defined in one or more processes in the flowcharts and/or in one or more blocks in the block diagrams.

These computer program instructions may alternatively be stored in a computer readable memory that can guide a computer or any other programmable data processing device to work in a specific manner, so that the instructions stored in the computer readable memory generate an artifact that includes an instruction apparatus. The instruction apparatus implements a specific function defined in one or more processes in the flowcharts and/or in one or more blocks in the block diagrams.

These computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specific function defined in one or more processes in the flowcharts and/or in one or more blocks in the block diagrams.

Obviously, a person skilled in the art can make various modifications and variations to this application without departing from the spirit and scope of this application. This application is intended to cover these modifications and variations to this application provided that they fall within the scope of protection defined by the following claims and their equivalent technologies.

What is claimed is:

1. A method for initiating a user plane path modification, comprising:
   determining, by a session management function device, a location report granularity of a terminal device based on a first service area, the first service area being a service area of a first user plane function device serving a session of the terminal device, wherein the location report granularity indicates a range for a mobility management function device to report location information of the terminal device to the session management function device;
   sending, by the session management function device, the location report granularity to the mobility management function device;
   receiving, by the mobility management function device, the location report granularity;
   determining, by the mobility management function device, that a first location information of the terminal device is out of the location report granularity;
   sending, by the mobility management function device, the first location information of the terminal device to the session management function device;
   receiving, by the session management function device, the first location information;

determining, by the session management function device, that the first location information is not within the first service area;

in response to the determination, selecting, by the session management function device, a first target user plane function device based on the first location information; and initiating, by the session management function device, a procedure to modify the user plane path for the session, the session is served by the first target user plane function device through the modified user plane path.

2. The method according to claim 1, further comprising:

determining, by the session management function device based on second location information of the terminal device, a session service area to which the session belongs, wherein the second location information is location information of the terminal device received by the session management function device in a process of establishing the session of the terminal device or in a process of handover from a second user plane function device to a third user plane function device, the second user plane function device is configured to serve a session of the terminal device before the handover to the third user plane function device, and the third user plane function device is configured to serve the session; and determining, by the session management function device, the location report granularity of the terminal device based on the first service area and the session service area, wherein the location report granularity is not larger than an intersection area of the first service area and the session service area.

3. The method according to claim 1, further comprising:

obtaining, by the session management function device, at least one location report requirement, wherein the at least one location report requirement comprises at least one piece of area information, and the at least one piece of area information indicates a range in which the terminal device needs to report location information; and determining, by the session management function device, the location report granularity based on the first service area and the at least one piece of area information, wherein the location report granularity is an intersection of the first service area and the at least one piece of area information.

4. The method according to claim 1, further comprising:

establishing, by the session management function device, a forwarding tunnel after determining that the first user plane function device has buffered data, wherein the forwarding tunnel is a tunnel between the first target user plane function device and the first user plane function device, so that the first user plane function device sends the buffered data to the first target user plane function device through the forwarding tunnel.

5. The method according to claim 4, further comprising:

starting, by the session management function device, a forwarding timer after establishing the forwarding tunnel, and deleting the forwarding tunnel after preset duration of the forwarding timer expires.

6. An apparatus for initiating a user plane path modification, comprising:

at least one processor; and a non-transitory computer readable medium in communication with the at least one processor, the computer readable medium storing computer readable instructions that, when executed by the at least one processor, cause the at least one processor to:

determine a location report granularity of a terminal device based on a first service area, the first service area being a service area of a first user plane function device serving a session of the terminal device, wherein the location report granularity indicates a range for a mobility management function device to report location information of the terminal device to the apparatus;

send the location report granularity to the mobility management function device;

receive first location information of the terminal device from the mobility management function device, wherein the first location information of the terminal device is out of the location report granularity;

determine that the first location information is not within a first service area;

in response to the determination, select a first target user plane function device based on the first location information; and initiate a procedure to modify the user plane path for the session, wherein the session is served by the first target user plane function device through the modified user plane path.

7. The apparatus according to claim 6, wherein the at least one processor further executes the instructions to:

determine, based on second location information of the terminal device, a session service area to which the session belongs, wherein the second location information is location information of the terminal device received by the apparatus in a process of establishing the session of the terminal device or in a process of handover from a second user plane function device to a third user plane function device, the second user plane function device is configured to serve a session of the terminal device before the handover to the third user plane function device, and the third user plane function device is configured to serve the session;

determine the location report granularity of the terminal device based on the first service area and the session service area, wherein the location report granularity is not larger than an intersection area of the first service area and the session service area.

8. The apparatus according to claim 7, wherein the at least one processor further executes the instructions to:

obtain at least one location report requirement, wherein the at least one location report requirement comprises at least one piece of area information, and the at least one piece of area information indicates a range in which the terminal device needs to report location information; and determine the location report granularity based on the first service area and the at least one piece of area information, wherein the location report granularity is an intersection of the first service area and the at least one piece of area information.

9. The apparatus according to claim 6, wherein the at least one processor further executes the instructions to:

establish a forwarding tunnel if determining that the first user plane function device has buffered data, wherein the forwarding tunnel is a tunnel between the first target user plane function device and the first user plane function device, so that the first user plane function device sends the buffered data to the first target user plane function device through the forwarding tunnel.

10. The apparatus according to claim 9, wherein the at least one processor further executes the instructions to:
start a forwarding timer after establishing the forwarding tunnel, and delete the forwarding tunnel after preset duration of the forwarding timer expires.

11. A communications system comprising:
a session management function device; and
a mobility management function device,
wherein the session management function device being configured to:
determine a location report granularity of a terminal device based on a first service area, the first service area being a service area of a first user plane function device serving a session of the terminal device, wherein the location report granularity indicates a range for the mobility management function device to report location information of the terminal device to the session management function device; and
send the location report granularity to the mobility management function device;
wherein the mobility management function device being configured to:
receive the location report granularity;
determine that a first location information of the terminal device is out of the location report granularity; and
send the first location information of the terminal device to the session management function device; and
wherein the session management function device being further configured to:
receive the first location information from the mobility management function device;
determine that the first location information is not within the first service area;
in response to the determination, select a first target user plane function device based on the first location information; and
initiate a procedure to modify a user plane path for the session, the first service area being a service area of a first user plane function device, wherein the session is served by the first target user plane function device through the modified user plane path.

12. The communications system according to claim 11, wherein the session management function device is further configured to: determine based on second location information of the terminal device, a session service area to which the session belongs, wherein the second location information is location information of the terminal device received by the session management function device in a process of establishing the session of the terminal device or in a process of handover from a second user plane function device to a third user plane function device, the second user plane function device is configured to serve a session of the terminal device before the handover to the third user plane function device, and the third user plane function device is configured to serve the session; and
wherein the mobility management function device is further configured to: determine the location report granularity of the terminal device based on the first service area and the session service area, wherein the location report granularity is not larger than an intersection area of the first service area and the session service area.

13. The communications system according to claim 11, wherein the session management function device is further configured to: obtain at least one location report requirement, wherein the at least one location report requirement comprises at least one piece of area information, and the at least one piece of area information indicates a range in which the terminal device needs to report location information; and
wherein the mobility management function device is further configured to: determine a location report granularity of the terminal device based on the first service area, comprises: determine the location report granularity based on the first service area and the at least one piece of area information, wherein the location report granularity is an intersection of the first service area and the at least one piece of area information.

14. The communications system according to claim 11, wherein the session management function device is further configured to: establish a forwarding tunnel after determining that the first user plane function device has buffered data, wherein the forwarding tunnel is a tunnel between the first target user plane function device and the first user plane function device, so that the first user plane function device sends the buffered data to the first target user plane function device through the forwarding tunnel.

15. The communications system according to claim 14, wherein the session management function device is further configured to: start a forwarding timer after establishing the forwarding tunnel, and delete the forwarding tunnel after preset duration of the forwarding timer expires.

16. The method according to claim 1, wherein the first location information is a network node identifier or a Tracking Area Identity (TAI).

17. The method according to claim 16, wherein the network node identifier is a cell identifier (ID).

* * * * *

UNITED STATES PATENT AND TRADEMARK OFFICE
CERTIFICATE OF CORRECTION

PATENT NO. : 11,224,085 B2
APPLICATION NO. : 16/415148
DATED : January 11, 2022
INVENTOR(S) : Zhu et al.

It is certified that error appears in the above-identified patent and that said Letters Patent is hereby corrected as shown below:

On the Title Page

Item (71) Applicant: "HUAWEI TECHNOLOGIES CO., LTD., Guangdong (CN)" should read
-- HUAWEI TECHNOLOGIES CO., LTD., Shenzhen (CN) --.

Signed and Sealed this
Thirty-first Day of May, 2022

Katherine Kelly Vidal
*Director of the United States Patent and Trademark Office*